US010693571B2

(12) United States Patent
Kikuma

(10) Patent No.: US 10,693,571 B2
(45) Date of Patent: Jun. 23, 2020

(54) IMAGE GENERATING APPARATUS, COMMUNICATION APPARATUS, ANTENNA ADJUSTMENT METHOD AND IMAGE GENERATING METHOD

(71) Applicant: NEC CORPORATION, Tokyo (JP)

(72) Inventor: Tomohiro Kikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/311,336

(22) PCT Filed: Jun. 2, 2017

(86) PCT No.: PCT/JP2017/020595
§ 371 (c)(1),
(2) Date: Dec. 19, 2018

(87) PCT Pub. No.: WO2017/221670
PCT Pub. Date: Dec. 28, 2017

(65) Prior Publication Data
US 2019/0190626 A1 Jun. 20, 2019

(30) Foreign Application Priority Data

Jun. 20, 2016 (JP) ................. 2016-121459

(51) Int. Cl.
H04B 17/23 (2015.01)
H04B 1/38 (2015.01)
(Continued)

(52) U.S. Cl.
CPC ......... H04B 17/23 (2015.01); G06K 9/00624 (2013.01); G06T 7/0002 (2013.01);
(Continued)

(58) Field of Classification Search
CPC ...................................................... H04B 17/23
See application file for complete search history.

(56) References Cited

U.S. PATENT DOCUMENTS

2012/0114025 A1* 5/2012 Gauthier .............. H04B 7/0811
375/219
2013/0135146 A1* 5/2013 Ransom .................. G01S 19/23
342/357.36
2015/0263408 A1* 9/2015 Hirabe ................. H01Q 1/1228
343/894

FOREIGN PATENT DOCUMENTS

JP 2000-315907 A 11/2000
JP 2004-253921 A 9/2004
(Continued)

OTHER PUBLICATIONS

International Search Report for PCT/JP2017/020595 dated Aug. 22, 2017 [PCT/ISA/210].

Primary Examiner — Ankur Jain
(74) Attorney, Agent, or Firm — Sughrue Mion, PLLC

(57) ABSTRACT

An image generating apparatus (1) includes a first image generating unit (12) and a second image generating unit (14). The first image generating unit (12) generates a first image showing, in a two-dimensional coordinate system the coordinate axes of which respectively correspond to angles of an antenna (20) in two axial directions, reception quality information indicating a quality of a received signal received by the antenna (20) at each antenna angle being the angles of the antenna (20) in the two axial directions. The second image generating unit (14) generates a second image that is a photographed image of a direction in which the antenna (20) faces at the antenna angles. Accordingly, provided is an image generating apparatus capable of easily and accurately adjusting an antenna in the most appropriate direction.

12 Claims, 22 Drawing Sheets

(51) Int. Cl.
*H04B 17/318* (2015.01)
*G06T 7/70* (2017.01)
*G06K 9/00* (2006.01)
*G06T 7/00* (2017.01)

(52) U.S. Cl.
CPC ............. *G06T 7/70* (2017.01); *H04B 1/38* (2013.01); *H04B 17/318* (2015.01)

(56) References Cited

FOREIGN PATENT DOCUMENTS

JP        2013-172377 A    9/2013
WO        2014/045495 A1   3/2014

* cited by examiner

| COLOR | RECEPTION QUALITY VALUE |
|---|---|
| RED | $Qa \leqq Q$ |
| ORANGE | $Qb \leqq Q < Qa$ |
| YELLOW | $Qc \leqq Q < Qb$ |
| BLUE | $Q < Qc$ |

Fig. 8

| COLOR | RECEPTION QUALITY VALUE |
|---|---|
| BRIGHT RED | $Q_i \leq Q \leq Q_{max}$ |
| RED | $Q_j \leq Q < Q_i$ |
| ORANGE | $Q_k \leq Q < Q_j$ |
| YELLOW | $Q_l \leq Q < Q_k$ |
| YELLOW GREEN | $Q_m \leq Q < Q_l$ |
| GREEN | $Q_n \leq Q < Q_m$ |
| BLUE | $Q < Q_n$ |

Fig. 16

IMAGE GENERATING APPARATUS, COMMUNICATION APPARATUS, ANTENNA ADJUSTMENT METHOD AND IMAGE GENERATING METHOD

CROSS REFERENCE TO RELATED APPLICATIONS

This application is a National Stage of International Application No. PCT/JP2017/020595, filed on Jun. 2, 2017, which claims priority from Japanese Patent Application No. 2016-121459, filed on Jun. 20, 2016, the disclosures of all of which are incorporated herein in their entirety by reference.

TECHNICAL FIELD

The present invention relates to an image generating apparatus, a communication apparatus, an antenna adjustment method, and an image generating method.

BACKGROUND ART

Regarding an antenna of a wireless communication apparatus or the like that receives radio waves from another wireless communication apparatus, when the communication apparatus receives radio waves from a radio wave generation source such as an opposite station, it is necessary to adjust the direction of the antenna in order to maximize the reception quality. For example, to adjust the direction of the antenna, an operator first visually makes a coarse adjustment by hand so that the front face of the antenna points to the radio wave generation source. Then, a fine adjustment of the antenna direction is made by hand to the angle at which the maximum reception level output is obtained by using a reception level monitor such as a voltmeter. However, in the case of adjusting the direction of an antenna by hand as described above, an installation error is likely to occur, and it takes a long time to adjust the antenna in the most appropriate direction.

In relation to the above technique, Patent Literature 1 discloses a wireless communication apparatus that is easy to maintain. The wireless communication apparatus disclosed in Patent Literature 1 includes wireless transmitting and receiving means using a directional antenna, and image pickup means having an optical axis which coincides with a radio-wave direction of the directional antenna for photographing an image of the radio-wave direction at a predetermined timing. Further, the wireless communication apparatus disclosed in Patent Literature 1 compares reference image data and image-pickup image data which are photographed by the image pickup means. From a result of the comparison, it detects and notifies that an object is toward a direction to block radio waves.

Further, Patent Literature 2 discloses an antenna apparatus including a directional angle visualizing device capable of coinciding a directivity of an antenna with an opposite antenna and avoiding the influence of obstacles present within a directional angle of the antenna. The wireless communication apparatus disclosed in Patent Literature 2 includes a cylindrical-shaped directional angle visualizing device which has a diameter and a length in which a view in a range of a predetermined directional angle, when seen from the side of one end of the device, can be seen on the side of the other end of the device, the cylindrical-shaped directional angle visualizing device being mounted on an antenna body parallel to the directivity thereof, and a mounting device capable of adjusting the directivity of the antenna body and fixing the antenna body toward any direction. Further, the predetermined directional angle of the directional angle visualizing device disclosed in Patent Literature 2 is a power half width of the antenna body, and the directional angle visualizing device is provided with scale means on the side of the other end of the device.

CITATION LIST

Patent Literature

Patent Literature 1: Japanese Unexamined Patent Application Publication No. 2013-172377
Patent Literature 2: Japanese Unexamined Patent Application Publication No. 2004-253921

SUMMARY OF INVENTION

Technical Problem

When the method for adjusting an antenna by using image data (camera image) photographed by the image-pickup means as disclosed in Patent Literature 1 is used, it has been difficult to adjust an antenna in the most appropriate direction due to causes such as diffraction. Further, in the technique disclosed in Patent Literature 2, a scale plate indicating a power strength estimated according to a viewing angle is merely mounted on a cylindrical-shaped directional angle visualizing device, and an actual reception strength is not considered. Therefore, it has been difficult to adjust an antenna in the most appropriate direction by using the techniques disclosed in Patent Literatures 1 and 2.

An object of the present invention is to solve such a problem and provide an image generating apparatus, a communication apparatus, an antenna adjustment method, and an image generating method capable of easily and accurately adjusting an antenna in the most appropriate direction.

Solution to Problem

An image generating apparatus according to the present invention includes: first image generating means for generating a first image showing, in a two-dimensional coordinate system the coordinate axes of which respectively correspond to angles of an antenna in two axial directions, reception quality information indicating a quality of a received signal received by the antenna at each of antenna angles, the antenna angles being the angles of the antenna in the two axial directions; and second image generating means for generating a second image, the second image being a photographed image of a direction in which the antenna faces at the antenna angles.

A communication apparatus according to the present invention includes: an image generation apparatus; a transmitting and receiving unit configured to transmit or receive a signal through the antenna; an antenna angle acquisition means for detecting the antenna angles and acquire antenna angle information indicating the detected antenna angles; a reception quality acquisition means for acquiring the reception quality information; and an image pick-up means for photographing a direction in which the antenna faces.

An antenna adjustment method according to the present invention includes: generating a first image showing, in a two-dimensional coordinate system the coordinate axes of which respectively correspond to angles of an antenna in two axial directions, reception quality information indicating a quality of a received signal received by the antenna at each antenna angle being the angles of the antenna in the two axial directions; generating a second image that is a photographed image of a direction in which the antenna faces at the antenna angles; and determining antenna angles of the antenna by using the first and second images.

An image generating method according to the present invention includes: generating a first image showing, in a two-dimensional coordinate system the coordinate axes of which respectively correspond to angles of an antenna in two axial directions, reception quality information indicating a quality of a received signal received by the antenna at each antenna angle being the angles of the antenna in the two axial directions; and generating a second image that is a photographed image of a direction in which the antenna faces at the antenna angles.

Advantageous Effects of Invention

According to the present invention, it is possible to provide an image generating apparatus, a communication apparatus, an antenna adjustment method, and an image generating method capable of easily and accurately adjusting an antenna in the most appropriate direction.

BRIEF DESCRIPTION OF DRAWINGS

FIG. 8 is a diagram showing an example of a color allocation table according to the first example embodiment;

FIG. 16 is a diagram showing an example of a color allocation table according to the second example embodiment;

DESCRIPTION OF EXAMPLE EMBODIMENTS

Outline of this Example Embodiment

Figure 1:
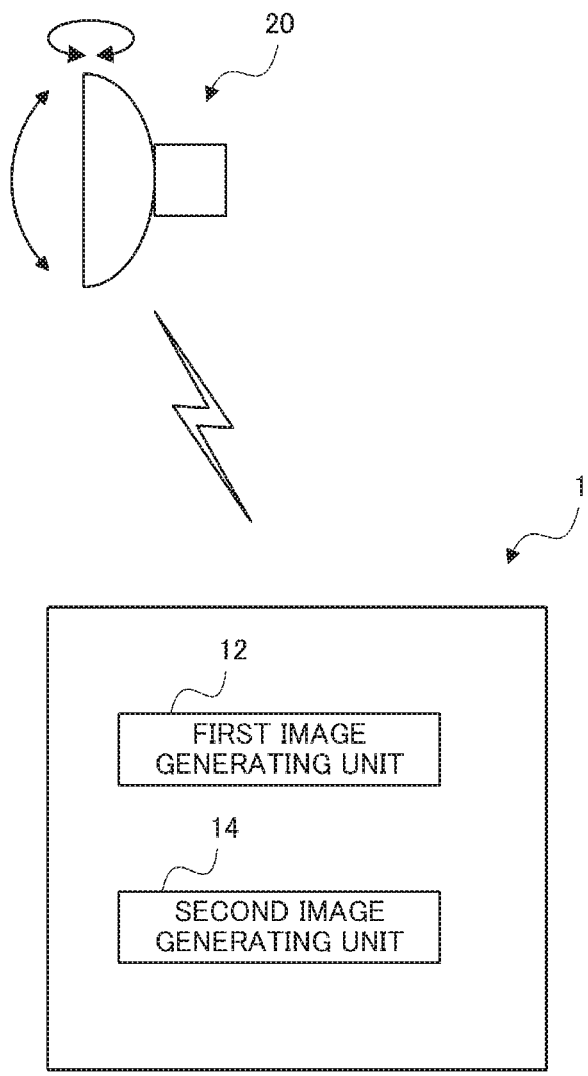
FIG. 1 is a diagram showing an outline of an image generating apparatus according to an embodiment.

Prior to describing example embodiments, an outline of this example embodiment is given hereinafter with reference to FIG. 1. FIG. 1 is a diagram showing an outline of an image generating apparatus 1 according to this example embodiment.

An image generating apparatus 1 includes a first image generating unit 12 (first image generating means) and a second image generating unit 14 (second image generating means). The first image generating unit 12 generates a first image showing, in a two-dimensional coordinate system the coordinate axes of which respectively correspond to angles of an antenna 20 in two axial directions, reception quality information indicating a quality of a received signal received by the antenna 20 at each antenna angle being the angles of the antenna 20 in the two axial directions. The second image generating unit 14 generates a second image being a photographed image of a direction in which the antenna 20 faces at the antenna angles. Note that the angle in the two axial directions corresponds to, for example, angles in a horizontal direction (horizontal angle) and a vertical direction (elevation angle). However, the two axial directions do not necessarily be orthogonal to each other.

The image generating apparatus 1 generates the first and the second images as described above, an operator who adjusts the antenna 20 therefore can use those images to adjust a direction of the antenna 20. Thus, the image generating apparatus 1 according to this example embodiment enables an easy and accurate adjustment of an antenna in the most appropriate direction. Note that a communication system that includes the image generating apparatus 1, and an antenna adjustment method and an image generating method using the image generating apparatus 1 also enable an easy and accurate adjustment of an antenna in the most appropriate direction.

First Example Embodiment

Example embodiments of the present invention are described hereinafter with reference to the drawings.

Figure 2:
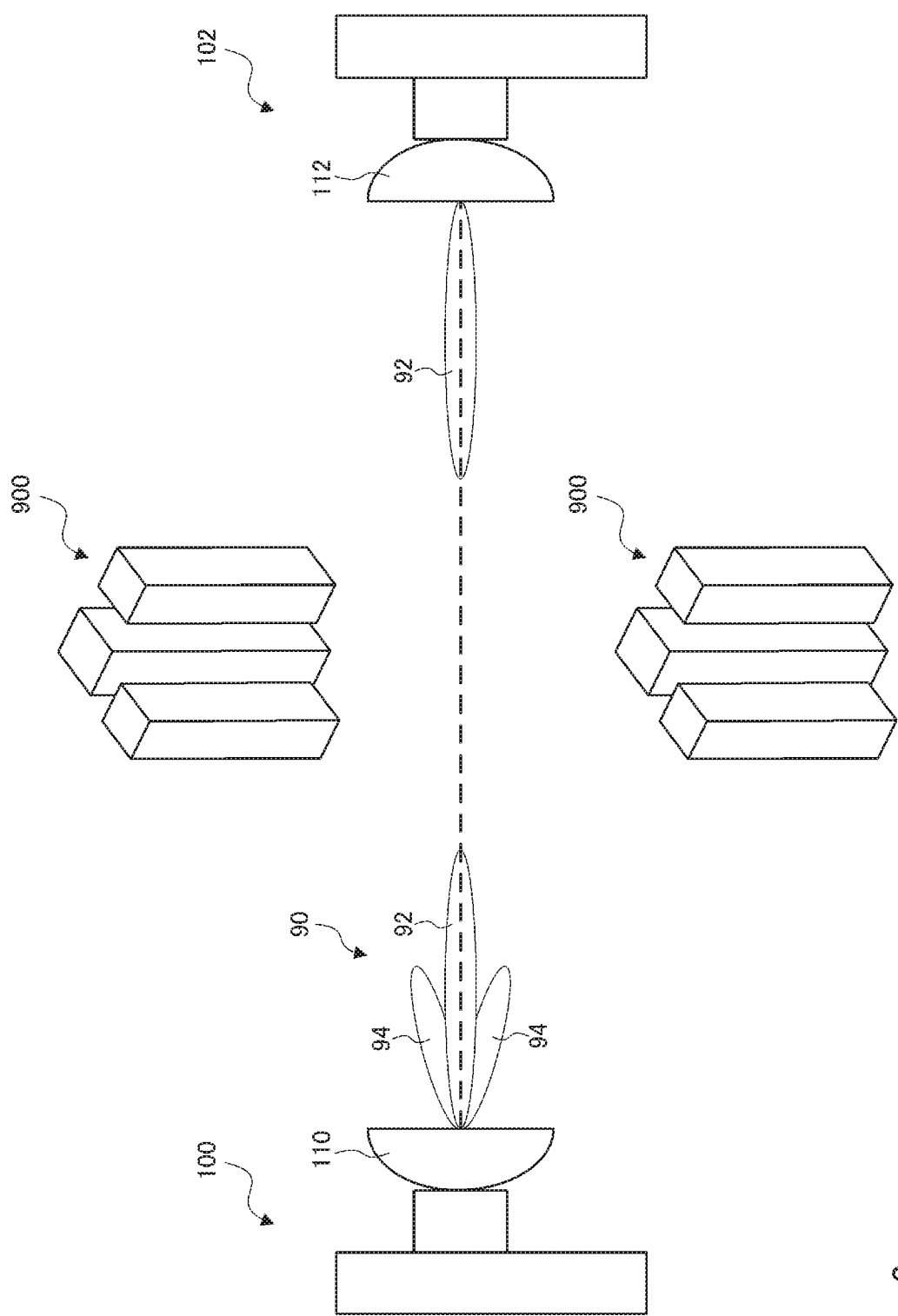
FIG. 2 is a diagram for explaining an adjustment of antenna angles between a wireless communication apparatus and an opposite station according to a first example embodiment.

FIG. 2 is a diagram for explaining an adjustment of antenna angles between a wireless communication apparatus 100 and an opposite station 102 according to the first example embodiment. Note that the opposite station 102 (another wireless communication apparatus) has substantially the same configuration as that of the wireless communication apparatus 100.

An antenna pattern 90 of an antenna 110 of the wireless communication apparatus 100 consists of a main lobe 92 in which the quality of a received signal (or a transmission signal) is highest and a side lobe 94 in which the quality thereof is lower than that of the main lobe 92. In the adjustment of antenna angles, the direction of the antenna 110 of the wireless communication apparatus 100 is adjusted so that the main lobe 92 in the antenna 110 of the wireless communication apparatus 100 is aligned with another main lobe 92 in an antenna 112 of the opposite station 102. At this time, when the wireless communication apparatus 100 is the receiving end and the opposite station 102 is the transmitting end, the antenna angles at which the reception quality in the wireless communication apparatus 100 is highest is the most appropriate direction of the antenna 110. Note that the "antenna angles" correspond to, for example, an angle in the horizontal direction (azimuth angle) and an angle in the vertical direction (elevation angle) of the antenna 110.

Further, an obstacle 900, which is an object such as a building, a tree, or the earth other than the antenna 112 having possibility of interfering with a communication, may be existed between the wireless communication apparatus 100 and the opposite station 102. The reception quality of the wireless communication apparatus 100 may be lower due to the existence of the obstacle 900, and it is therefore desired to consider the existence of the obstacle 900 when adjusting the antenna 110 in the most appropriate direction. It is generally necessary to consider a Fresnel zone (a first Fresnel zone) existing between the wireless communication apparatus 100 and the opposite statin 102. The explanation will be given hereinafter.

Figure 3:
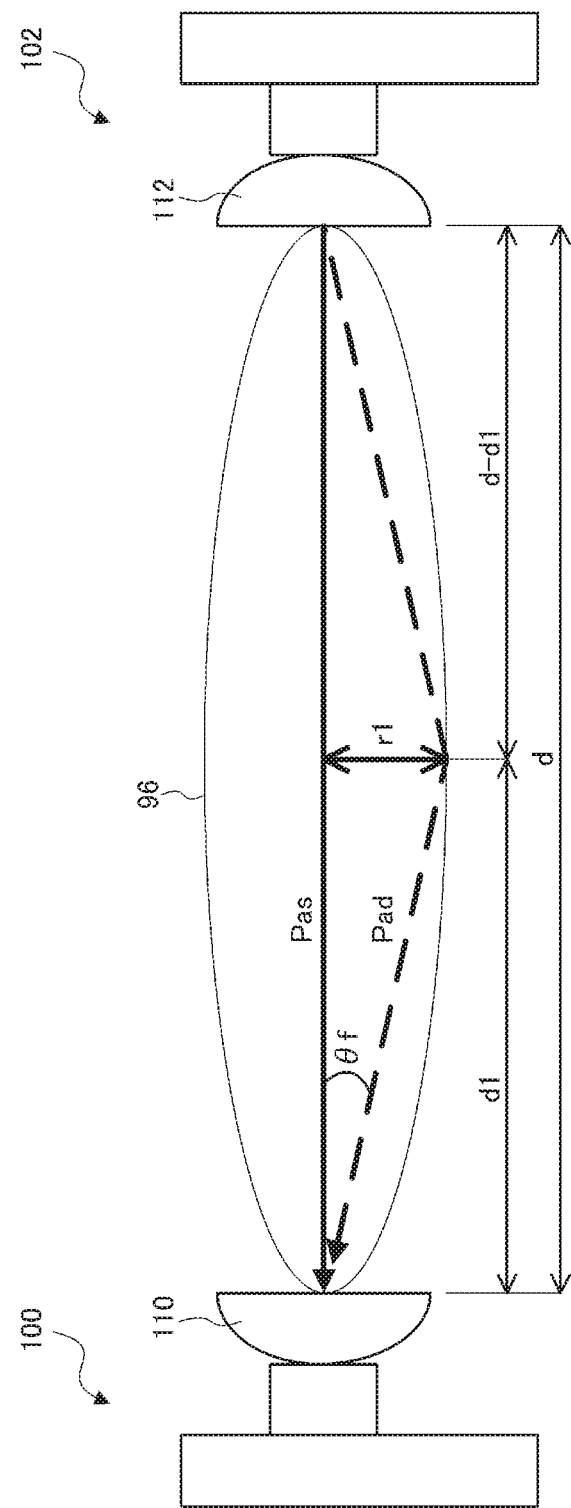
FIG. 3 is a diagram for explaining a Fresnel zone existing between the wireless communication apparatus and the opposite station.

FIG. 3 is a diagram for explaining a Fresnel zone 96 existing between the wireless communication apparatus 100 and the opposite station 102. The Fresnel zone 96 (the first Fresnel zone) is a spheroidal space created within a locus of a detour path Pad having a path difference of within $\lambda/2$ from a shortest path Pas when the wireless communication apparatus 100 receives radio waves from the opposite station 102. Here, $\lambda$[m] is a wavelength of a working frequency of a radio wave. When the ratio of the obstacle 900 existing in the Fresnel zone 96 is large, the energy of the radio wave is not sufficiently transmitted from the opposite station 102 to the wireless communication apparatus 100, and thus the reception quality thereof may be decreased.

Note that d[m] is defined as a distance (link distance d) between the antenna 112 (transmission antenna) of the opposite station 102 and the antenna 110 of the wireless communication apparatus 100. In this case, when it is assumed that a radius (Fresnel radius) of a circle of a cross section of the Fresnel zone 96 at a position of a distance d1 (d1<d) from the wireless communication apparatus 100 toward the opposite station 102 is r1, the following expression 1 holds.

$$r1=\sqrt{[\lambda*\{d1*(d-d1)\}/d]} \quad \text{(Expression 1)}$$

A Fresnel radius r1 is determined from the expression 1 according to the distance d1 from the antenna 110 of the wireless communication apparatus 100. Note that at the point of d1=d/2, that is, at the midpoint between the antenna 112 of the opposite station 102 and the antenna 110 of the wireless communication apparatus 100, the Fresnel radius r1 is maximized.

Further, when it is assumed that an angle of the detour path Pad with respect to the shortest path Pas is $\theta f$, the following expression 2 holds.

$$\theta f=\tan(r1/d1) \quad \text{(Expression 2)}$$

Figure 4:
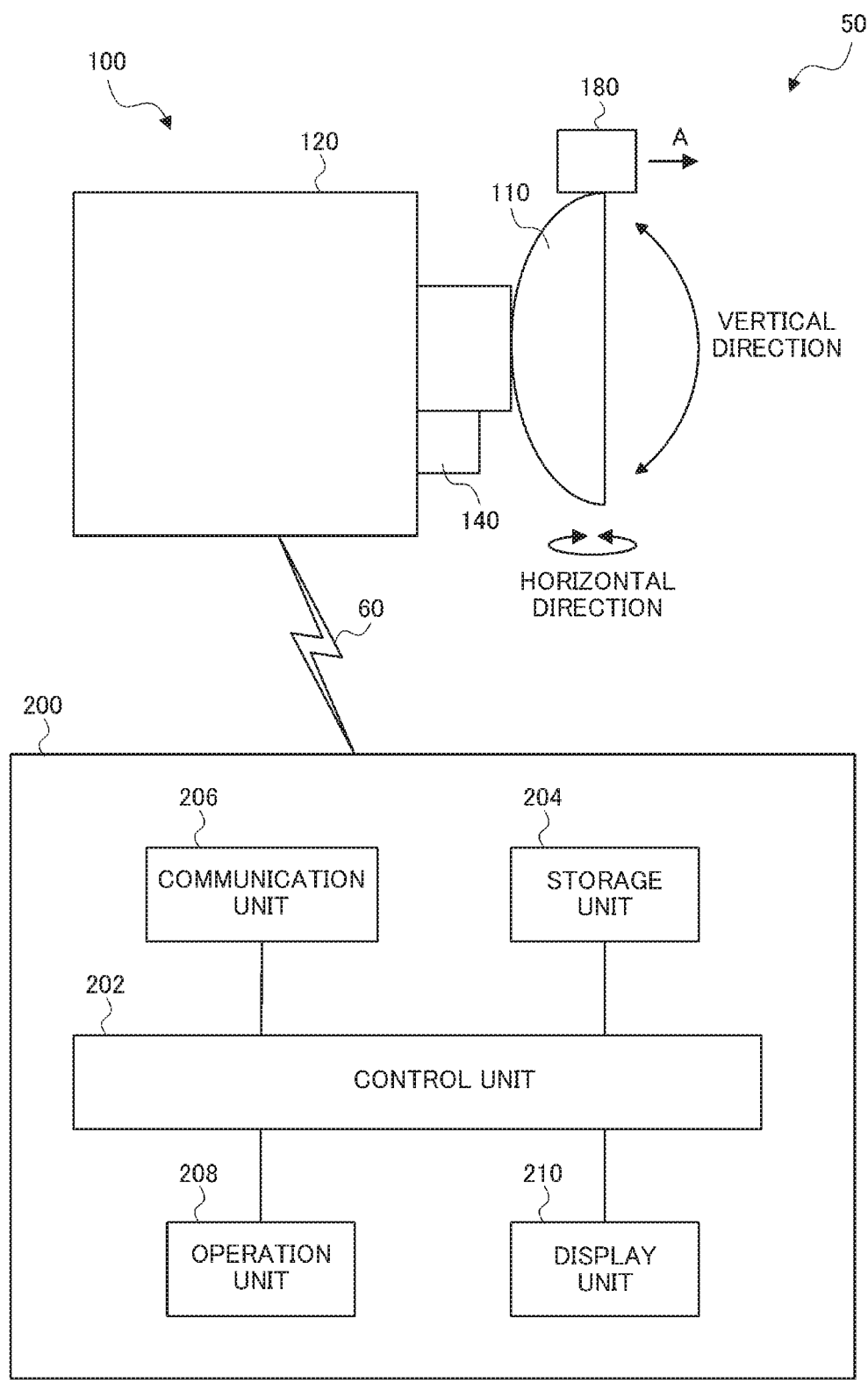
FIG. 4 is a diagram showing a hardware configuration of a communication system according to the first example embodiment.

FIG. 4 is a diagram showing a hardware configuration of a communication system 50 according to the first example embodiment. The communication system 50 includes the wireless communication apparatus 100 and an image generating apparatus 200. The image generating apparatus 200 is connected to the wireless communication apparatus 100 in such a manner that they can communicate through a communication channel 60. The communication channel 60 may be a wired connection such as a cable or a wireless connection such as WiFi or Bluetooth (registered trademark). Further, there may be a plurality of communication channels 60, and a combination of wired and wireless connections may be used. Note that the following example embodiment will be explained as that the wireless communication apparatus 100 and the image generating apparatus 200 are components physically separated from each other. However, the wireless communication apparatus 100 may be configured to include the image generating apparatus 200.

The wireless communication apparatus 100 includes an antenna 110 that receives radio signals from a radio wave generation source such as the opposite station 102 (another wireless communication apparatus), a communication instrument 120, and an antenna angle detection unit 140 that detects the angle of the antenna 110. The communication instrument 120 will be described later. The direction of the antenna 110 can be adjusted in the horizontal direction and in the vertical direction by, for example, hand. Note that directions (antenna angles) of the antenna 110 may be adjusted by a mechanical structure such as a motor or the like, instead of it being adjusted by hand.

The antenna angle detection unit 140 detects the angles in the horizontal direction (horizontal angle) and the vertical direction (elevation angle) of the antenna 110. The antenna angle detection unit 140 includes, for example, a gyro sensor or the like, though it is not limited thereto. Further, the antenna angle detection unit 140 is preferably installed externally near the antenna 110. Note, however, that the antenna angle detection unit 140 may be installed inside the wireless communication apparatus 100.

Further, a camera 180 which is image pickup means is provided in the antenna 110. That is, the wireless communication apparatus 100 includes the camera 180. For example, the camera 180 is fixed on the antenna 110. The camera 180 photographs a direction in which the antenna 110 faces. Note that an optical axis direction of the camera 180 is along with a direction in which the antenna 110 faces as indicated by the arrow A. Therefore, the camera 180 is configured to photograph a view in a direction according to directions in which the antenna 110 faces, that is, the antenna angles. Note that the camera 180 does not necessarily be fixed to the antenna 110. For example, the camera 180 may photograph the direction in which the antenna 110 faces by being provided in an apparatus different from that provided in the antenna 110 which can control the direction according to a change of the direction of the antenna 110. Further, when photographing is performed, the camera 180 transmits image pickup data showing a photographed subject to the image generating apparatus 200.

The image generating apparatus 200 generates some image and displays the generated image in a way visible to a user (operator). The image generating apparatus 200 is, for example, a computer. The image generating apparatus 200 is, for example, an information processing apparatus such as a tablet terminal or a smartphone, though it is not limited thereto. The image generating apparatus 200 includes a control unit 202 such as a CPU (Central Processing Unit), a storage unit 204 such as a memory or a hard disk, a communication unit 206, an operation unit 208, and a display unit 210. The control unit 202 controls the storage unit 204, the communication unit 206, the operation unit 208, and the display unit 210.

The communication unit 206 performs processing that is necessary for communications with the wireless communication apparatus 100 connected through the communication channel 60. The operation unit 208 is, for example, a touch panel, an LCD (Liquid Crystal Display), a keyboard or the like. The display unit 210 is, for example, a touch panel, an LCD or the like. The operation unit 208 and the display unit 210 may be integrated as a touch panel. The operation unit 208 receives a user operation by control of the control unit 202. The display unit 210 displays information that is required for a user, such as an image, by control of the control unit 202. Note that hereinafter, the term "image" also means "image data showing image" as a subject to be processed in the communication processing.

Figure 5:
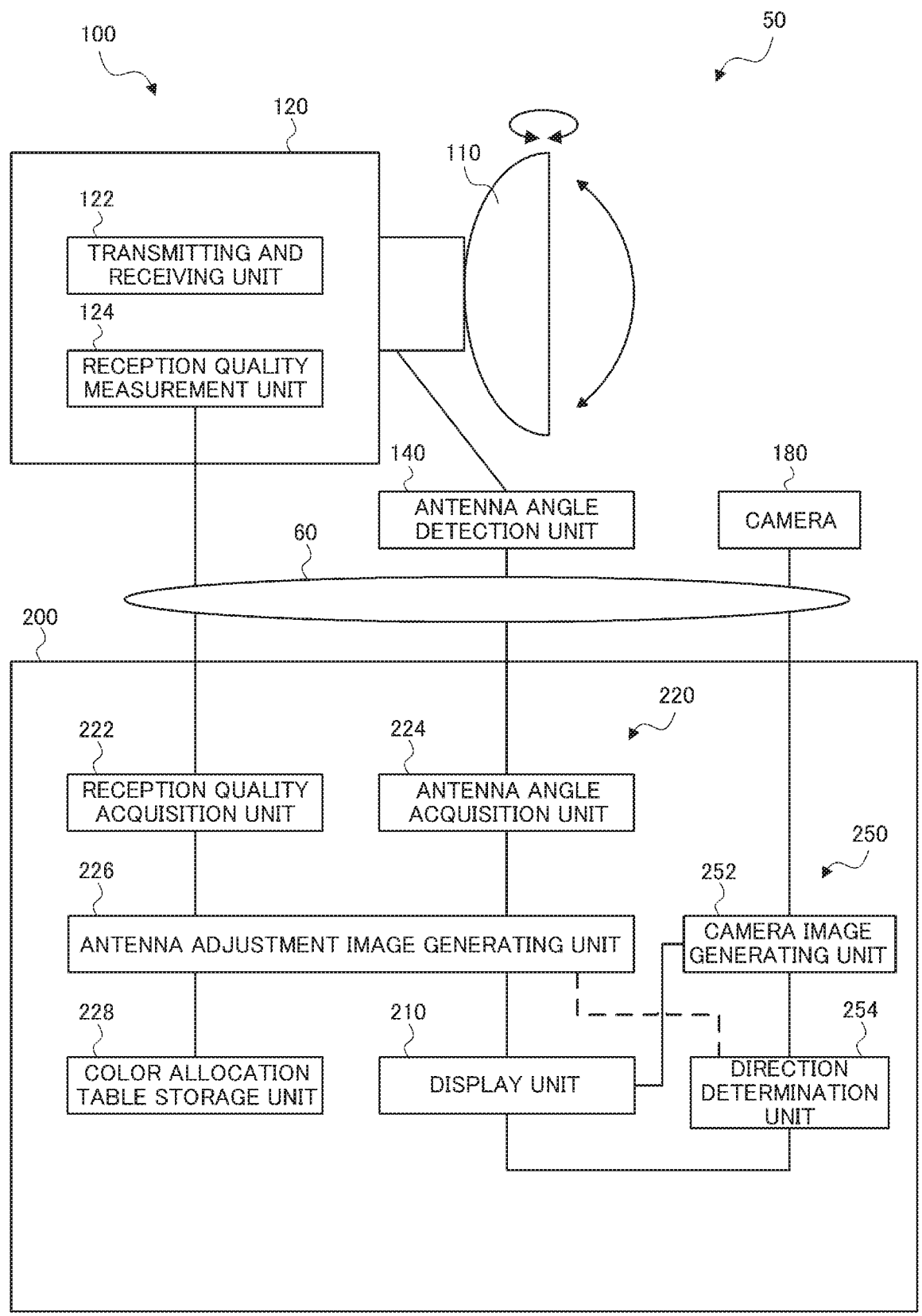
FIG. 5 is a functional block diagram showing a hardware configuration of the communication system according to the first example embodiment.

FIG. 5 is a functional block diagram of the communication system 50 according to the first example embodiment. The communication instrument 120 includes a transmitting and receiving unit 122 and a reception quality measurement unit 124. The transmitting and receiving unit 122 receives a signal through the antenna 110, performs necessary processing such as demodulation, and thereby obtains user data. Further, the transmitting and receiving unit 122 performs necessary processing such as modulation on user data and transmits a signal through the antenna 110.

The reception quality measurement unit 124 measures the quality of a received signal received by the antenna 110. The reception quality measurement unit 124 then outputs reception quality information indicating the measured quality (quality value) of the received signal to the image generating apparatus 200 through the communication channel 60. That is, the reception quality measurement unit 124 has a function as reception quality acquisition means for acquiring reception quality information. Further, the function of the reception quality measurement unit 124 is not necessarily provided inside the communication instrument 120, and it may be provided outside the communication instrument 120.

Note that the "quality of a received signal" may be, for example, a Received Signal Level (RSL) or a Received Signal Strength Indication (RSSI). Further, the "quality of a received signal" may be, for example, a Signal to Noise Ratio (SNR), a Signal to Interference Noise Ratio (SINR) or a Carrier to Interference Noise Ratio (CINR). Furthermore, the "quality of a received signal" may be a combination of two or more of the above.

The antenna angle detection unit 140 detects the horizontal angle and the vertical angle of the antenna 110 as described above. Then, the antenna angle detection unit 140 outputs antenna angle information indicating the detected antenna angles (the horizontal angle and the vertical angle) to the image generating unit 200 through the communication channel 60. That is, the antenna angle detection unit 140 has a function as antenna angle acquisition means for detecting antenna angles and acquire antenna angle information indicating the detected antenna angles.

The image generating apparatus 200 includes the display unit 210, an antenna adjustment image processing unit 220, and a camera image processing unit 250. The antenna adjustment image processing unit 220 includes a reception quality acquisition unit 222, an antenna angle acquisition unit 224, an antenna adjustment image generating unit 226, and a color allocation table storage unit 228. Further, the camera image processing unit 250 includes a camera image generating unit 252 and a direction determination unit 254. Note that the reception quality acquisition unit 222, the antenna angle acquisition unit 224, the antenna adjustment image generating unit 226, and the color allocation table storage unit 228, the camera image generating unit 252, and the direction determination unit 254 can be implemented using a program. To be specific, the control unit 202 executes a program stored in the storage unit 204 so that the components can be implemented. Further, the components are not necessarily implemented by software as a program; instead, they can be implemented by a combination of any hardware, firmware and software or the like. The same applies to the other example embodiments.

The reception quality acquisition unit 222 acquires the reception quality information output from the reception quality measurement unit 124 through the communication channel 60. The reception quality acquisition unit 222 then outputs the acquired reception quality information to the antenna adjustment image generating unit 226. The antenna angle acquisition unit 224 acquires the antenna angle information output from the antenna angle detection unit 140 through the communication channel 60. The antenna angle acquisition unit 224 then outputs the acquired antenna angle information to the antenna adjustment image generating unit 226.

The antenna adjustment image generating unit 226 generates an antenna adjustment image (a first image) in which the antenna angle information and the reception quality information are associated with each other by using the reception quality information and the antenna angle information. The color allocation table storage unit 228 stores a color allocation table (which is described later with reference to FIG. 8) that is used when the antenna adjustment image generating unit 226 generates the antenna adjustment image. Then, the display unit 210 displays the generated antenna adjustment image.

Note that the antenna adjustment image is formed with a two-dimensional coordinate system where the horizontal axis indicates an angle in the horizontal direction (horizontal angle) and the vertical axis indicates an angle in the vertical direction (elevation angle), as described later with reference to FIG. 9. That is, the coordinate axes of the two-dimensional coordinate system in the antenna adjustment image respectively correspond to the angles of the antenna 110 in two axial directions. The antenna adjustment image is formed so that the reception quality information corresponding to each antenna angle is plotted in the two-dimensional coordinate system. Further, the reception quality information is plotted in the antenna adjustment image so that the reception quality information indicating the same quality becomes the same image representation (e.g., color representation). Further, the antenna adjustment image can be used to adjust the antenna angles of the antenna 110. This will be described in detail later.

The camera image generating unit 252 acquires image pickup data from the camera 180. The camera image generating unit 252 then uses the image pickup data to generate a camera image (second image) showing a direction in which the antenna 110 faces. The direction determination unit 254 uses at least the camera image to determine validity of the antenna angles adjusted by using the antenna adjustment image. That is, the direction determination unit 254 has a function as determination means. This will be described in detail later. Note that the direction determination unit 254 may use the camera image and the antenna adjustment image to determine the validity of the adjusted antenna angles. Note that the "validity of the antenna angles" means that the antenna angles have been adjusted to such an extent that the wireless communication apparatus 100 can perform communications with the opposite station 102 with a sufficient communication quality.

Figure 6:
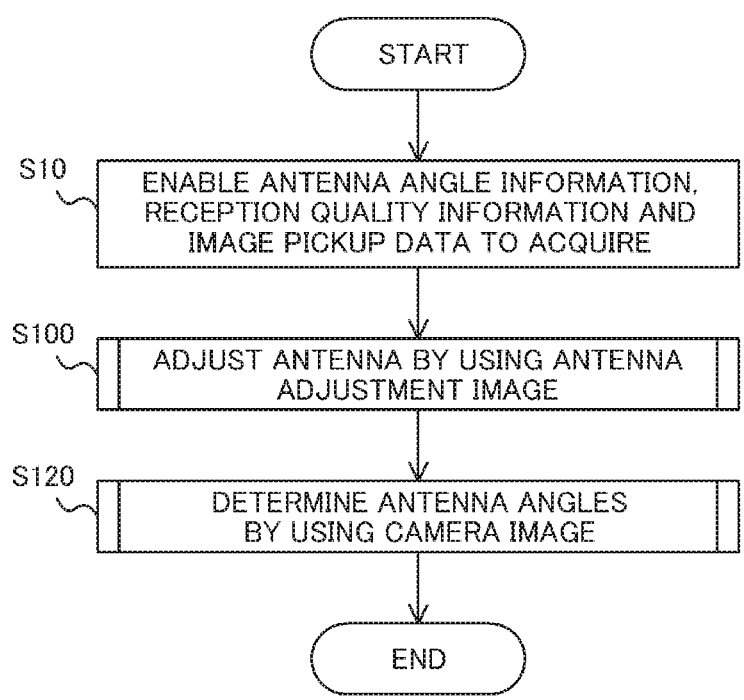
FIG. 6 is a flowchart showing an antenna adjustment method according to the first example embodiment.

FIG. 6 is a flowchart showing an antenna adjustment method according to the first example embodiment. First, the image generating apparatus 200 is installed to be able to acquire the antenna angle information, the reception quality information and the image pickup data (Step S10). To be specific, a user (operator) connects the image generating apparatus 200 and the wireless communication apparatus 100 so that they can communicate through the communication channel 60. This allows the image generating apparatus 200 to acquire the antenna angle information, the reception quality information and the image pickup data.

Next, in Steps S100 and S120, antenna angle determination processing is performed. To be specific, in Step S100, the antenna angle adjustment is performed by using the antenna adjustment image (a step of an antenna angle adjustment). Further, in Step S120, the validity of the antenna angles adjusted in the step of the antenna angle adjustment (Step S100) is determined by using the camera image (a step of an antenna angle determination). This will be described in detail later.

Figure 7:
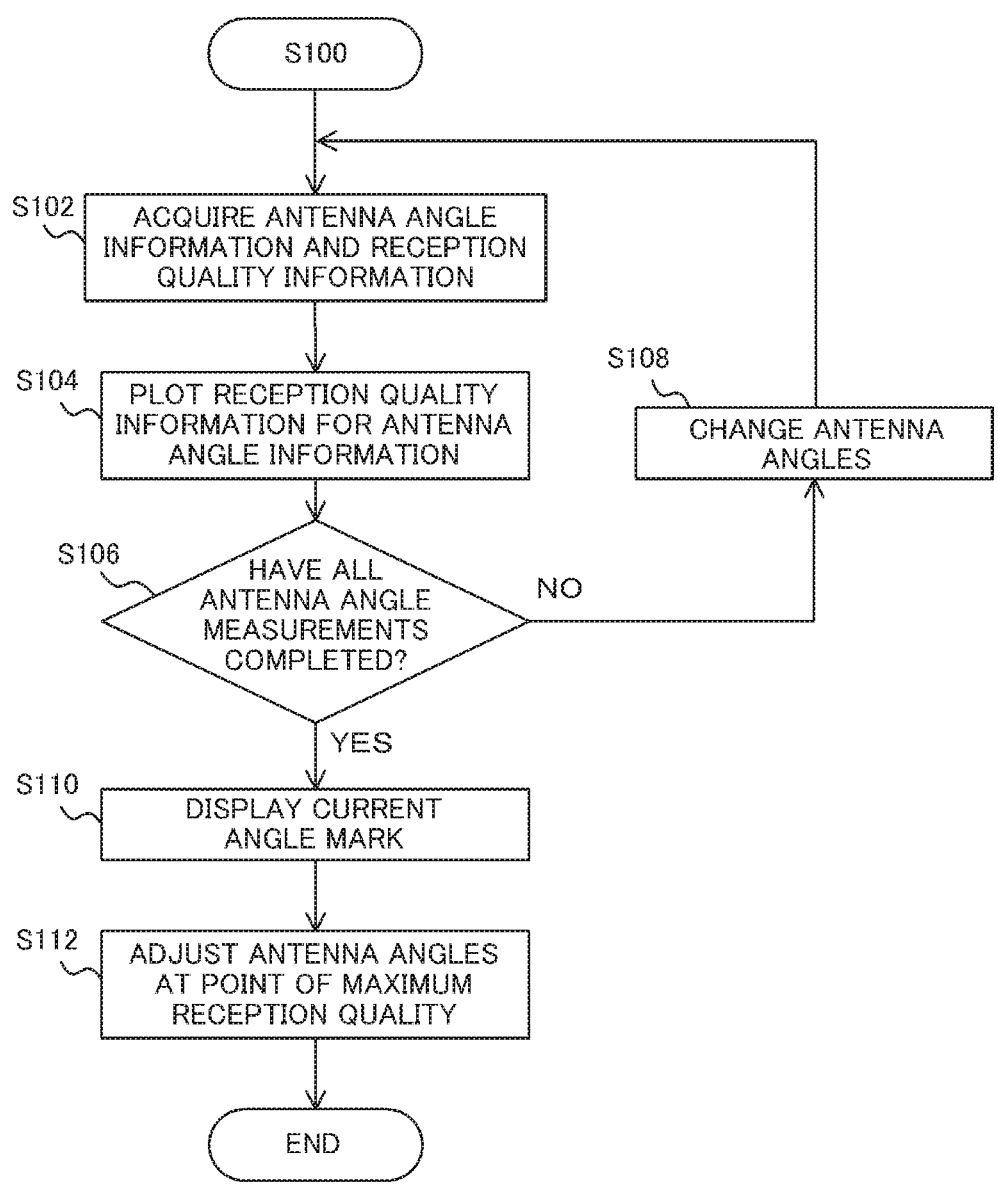
FIG. 7 is a flowchart showing a detail of a step of antenna angles adjustment shown in FIG. 6.

FIG. 7 is a flowchart showing a detail of the step of the antenna angle adjustment (Step S100) shown in FIG. 6. Next, the image generating apparatus 200 acquires the antenna angle information and the reception quality information (Step S102). To be specific, the reception quality acquisition unit 222 of the image generating apparatus 200 acquires the reception quality information through the communication channel 60 as described above. Further, the antenna angle acquisition unit 224 acquires the antenna angle information through the communication channel 60.

Next, the image generating apparatus 200 plots the reception quality information corresponding to the antenna angle information (Step S104). To be specific, in the first example embodiment, the color allocation table storage unit 228 stores the color allocation table in advance as shown in FIG. 8. Then, the antenna adjustment image generating unit 226 plots the reception quality information at the positions corresponding to the antenna angle information in the two-dimensional coordinate system by using the color allocation table. The antenna adjustment image generating unit 226 thereby generates an antenna adjustment image. The display unit 210 then displays the antenna adjustment image generated by the antenna adjustment image generating unit 226.

FIG. 8 is a diagram showing an example of a color allocation table according to the first example embodiment. In the example of FIG. 8, when a reception quality value Q indicated by the reception quality information is equal to or more than Qa, the antenna adjustment image generating unit 226 plots the position corresponding to the antenna angle information related to that reception quality information by red color. Further, when the reception quality value Q is equal to or more than Qb and less than Qa, the antenna adjustment image generating unit 226 plots the position corresponding to the antenna angle information related to that reception quality information by orange color. Further, when the reception quality value Q is equal to or more than Qc and less than Qb, the antenna adjustment image generating unit 226 plots the position corresponding to the antenna angle information related to that reception quality information by yellow color. Further, when the reception quality value Q is less than Qc, the antenna adjustment image generating unit 226 plots the position corresponding to the antenna angle information related to that reception quality information by blue color.

For example, when the antenna angle information indicates [horizontal angle, vertical angle]=[θh1, θv1] and the reception quality information indicates Q1 (Qa≤Q1), the antenna adjustment image generating unit 226 plots the position of [θh1, θv1] by red color. Further, for example, when the antenna angle information indicates [horizontal angle, vertical angle]=[θh2, θv2] and the reception quality information indicates Q2 (Qb≤Q2<Qa), the antenna adjustment image generating unit 226 plots the position of [θh2, θv2] by orange color. Likewise, for example, when the antenna angle information indicates [horizontal angle, vertical angle]=[θh3, θv3] and the reception quality information indicates Q3 (Qc≤Q3<Qb), the antenna adjustment image generating unit 226 plots the position of [θh3, θv3] by yellow color.

Note that, although the reception quality information is represented by four colors in the first example embodiment, it is not limited thereto. The reception quality information may be represented by five or more colors. Further, in the first example embodiment, the color allocation table can be set arbitrarily by a user or the like by some experimental rules and the like.

After that, the image generating apparatus 200 determines whether the measurement of the quality of a received signal is done for all angles (Step S106). To be specific, the antenna adjustment image generating unit 226 determines whether the reception quality information has been obtained for all antenna angles in a predetermined range. Note that the "predetermined range" may be, for example, a range where the horizontal angle is between −90° to +90° and the vertical angle is between −90° to +90°. Further, in the case where a relatively accurate adjustment is possible in a coarse adjustment, the "predetermined range" may be, for example, a range where the horizontal angle is between −20° to +20° and the vertical angle is between −20° to +20°.

When the measurement of the quality of a received signal is not done for all angles (No in Step S106), the antenna angles are changed (Step S108). To be specific, a user moves the antenna 110 and changes at least one of the horizontal angle and the vertical angle of the antenna 110. On the other hand, when the measurement of the quality of a received signal is done for all angles (Yes in Step S106), the image generating apparatus 200 displays a current angle mark indicating the current antenna angles of the antenna 110 (Step S110). To be specific, when the measurement of the quality of a received signal is done for all angles, the generation of the antenna adjustment image is completed. Then, the antenna angle acquisition unit 224 acquires the antenna angle information indicating the current antenna angles from the antenna angle detection unit 140 and outputs it to the antenna adjustment image generating unit 226. The antenna adjustment image generating unit 226 displays the current angle mark at the position corresponding to the current antenna angles of the antenna 110 on the completed antenna adjustment image by using the current antenna angle information.

Next, the antenna angles are adjusted to the point with the highest reception quality by using the antenna adjustment image (Step S112). The antenna angles can be thereby adjusted to the vicinity of the center of an antenna beam. To be specific, a user changes the antenna angles of the antenna 110, looking at the antenna adjustment image, and sets the current angle mark at the point at which the quality of a received signal is highest on the antenna adjustment image. At this time, each time the current antenna angles are changed, the antenna angle acquisition unit 224 acquires the antenna angle information. Then, each time the current antenna angles are changed, the antenna adjustment image generating unit 226 moves the position of the current angle mark on the antenna adjustment image.

At this time, a user may adjust the direction of the antenna 110 by hand, or the direction of the antenna 110 may be adjusted by using an electrical or mechanical structure. Further, the image generating apparatus 200 may automatically control the antenna 110 so that the antenna angles are set at the point with the highest reception quality.

The antenna adjustment image 70 according to this example embodiment is formed so that the reception quality information corresponding to each antenna angle is plotted in a two-dimensional coordinate system composed of a horizontal angle and a vertical angle. A user can thereby easily grasp the antenna angles corresponding to the main lobe 92. Accordingly, a user can easily adjust the antenna in the most appropriate direction.

Figure 9:
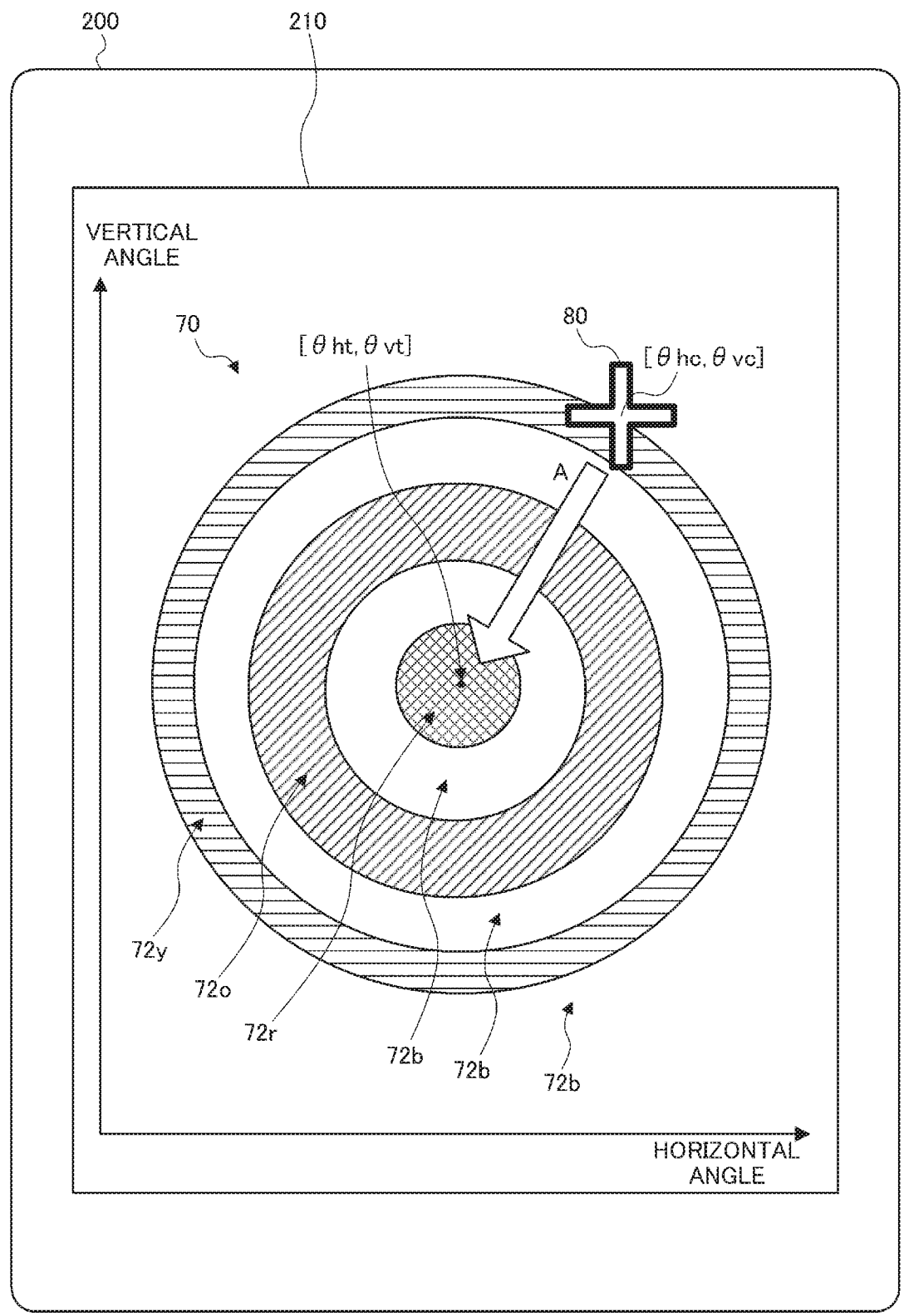
FIG. 9 is a diagram showing an example of an antenna adjustment image displayed on the image generating apparatus according to the first example embodiment.

FIG. 9 is a diagram showing an example of an antenna adjustment image displayed on the image generating apparatus 200 according to the first example embodiment. In FIG. 9, the display unit 210 displays an antenna adjustment image 70. In the antenna adjustment image 70, the horizontal direction (the horizontal axis in the two-dimensional coordinate system) indicates an angle in the horizontal direction (horizontal angle), and the vertical direction (the vertical axis in the two-dimensional coordinate system) indicates an angle in the vertical direction (vertical angle). Further, the display unit 210 displays a current angle mark 80 at the position corresponding to the current antenna angles [θhc, θvc]. Because the reception quality information indicating the same quality is shown using the same color representation in the antenna adjustment image 70, the antenna adjustment image 70 is formed like an isopleth diagram.

In the example of FIG. 9, in the antenna adjustment image 70, a region 72r located near the center is represented by red color. In the above example, the region 72r indicates the antenna angles corresponding to the reception quality information in which the reception quality value is equal to or more than Qa. Further, in the antenna adjustment image 70, a region 72o located outside the region 72r is represented by orange color. In the above example, the region 72o indicates the antenna angles corresponding to the reception quality information in which the reception quality value is equal to or more than Qb and less than Qa. Further, in the antenna adjustment image 70, a region 72y located outside the region 72o is represented by yellow color. In the above example, the region 72y indicates the antenna angles corresponding to the reception quality information in which the reception quality value is equal to or more than Qc and less than Qb. Further, in the antenna adjustment image 70, a region 72b is represented by blue color. The region 72b is located between the region 72r and the region 72o, between the region 72o and the region 72y, and outside the region 72y. In the above example, the region 72b indicates the antenna angles corresponding to the reception quality information in which the reception quality value is less than Qc.

Further, in the above example, a point (the reception quality information: Q1) corresponding to the antenna angles [θh1, θv1] is included in the region 72r. Further, a point (the reception quality information: Q2) corresponding to the antenna angles [θh2, θv2] is included in the region 72o. Likewise, a point (the reception quality information: Q3) corresponding to the antenna angles [θh3, θv3] is included in the region 72y.

Note that in FIG. 9, the quality of a received signal is highest at the position corresponding to the region 72r. That is, the antenna angles corresponding to the region 72r can correspond to the main lobe 92. On the other hand, in the region 72o and the region 72y, the quality of a received signal is lower than that in the region 72r. Thus, the antenna angles corresponding to the region 72o and the region 72y can correspond to the side lobe 94. Accordingly, the point [θht, θvt] at the center of the region 72r in the antenna adjustment image 70 is estimated as the point at which the reception quality value is highest. Therefore, a user adjusts the antenna angles so as to set the current angle mark at the point [θht, θvt] as shown by the arrow A. A user can thereby easily adjust the antenna 110 in the most appropriate direction.

Figure 10:
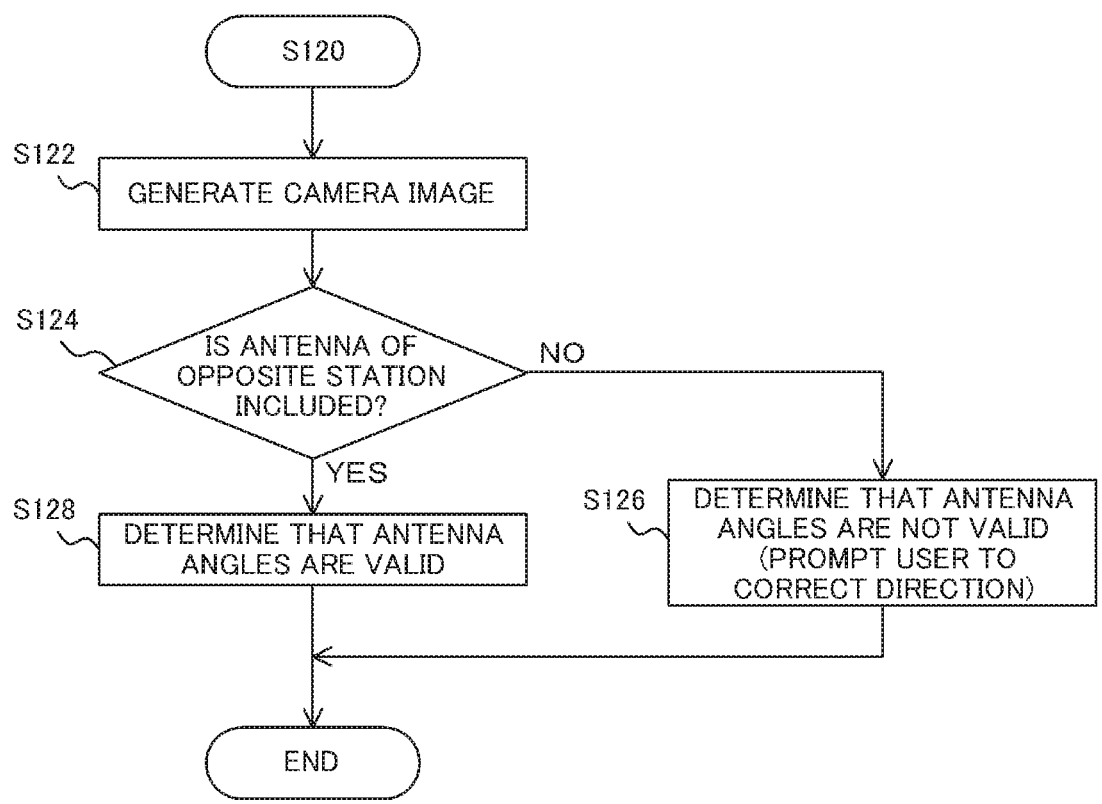
FIG. 10 is a flowchart showing a detail of a step of an antenna angle determination shown in FIG. 6.

FIG. 10 is a flowchart showing a detail of the step of the antenna angle determination (Step S120) shown in FIG. 6. The image generating apparatus 200 generates a camera image (Step S122). To be specific, the camera image generating unit 252 of the image generating apparatus 200 acquires the image pickup data from the camera 180 to generate the camera image as described above. At this time, the camera image generating unit 252 can control the display unit 210 so as to display the camera image. Note that the camera image may be a still image or a moving image.

Next, the direction determination unit 254 of the image generating apparatus 200 determines whether an image corresponding to the antenna 112 of the opposite station 102, that is, an image showing the antenna 112 (an antenna image) is included in the generated camera image (Step S124). When the antenna image is not included in the camera image (No in Step S124), the direction determination unit 254 determines that the antenna angles adjusted in the step of the antenna angle adjustment (Step S100) is not valid (Step S126). The direction determination unit 254 then controls the display unit 210 so as to display the result of the determination in which the adjusted antenna angles are not valid. In this case, the direction determination unit 254 may control the display unit 210 so as to display a message prompting a user to correct the antenna angles.

On the other hand, when the antenna image is included in the camera image (Yes in Step S124), the direction determination unit 254 determines that the antenna angles adjusted in the step of the antenna angle adjustment (Step S100) is valid (Step S128). The direction determination unit 254 then controls the display unit 210 so as to display the result of the determination in which the adjusted antenna angles are valid. The antenna 110 can be thereby easily and accurately adjusted in the most appropriate direction.

Note that the determination whether the antenna image is included in the camera image may be performed by recognizing the antenna 112 of the opposite station 102 (the antenna image) from the camera image, for example, by using image recognition techniques. In this case, this determination can be performed by using a pattern matching technique. To be specific, this determination may be performed by taking a shape, a color, a size, and the like of the antenna 112 into consideration. For example, when the antenna 112 of the opposite station 102 is a white circular shape such as a parabolic antenna, the direction determination unit 254 may determine that the antenna image is included in the camera image in the case where a white circular object is included therein.

Further, a mark capable of identifying the antenna 112 may be provided in the antenna 112 of the opposite station 102 or in the vicinity thereof. Then, the direction determination unit 254 may determine whether the image of the mark is included in the camera image. The mark may be, for example, a QR code (registered trademark), a logo, or a light emitted from a light emitter. Further, when using the light, the direction determination unit 254 may determine by a color of the light, or by a blinking cycle of the light.

Figure 11:
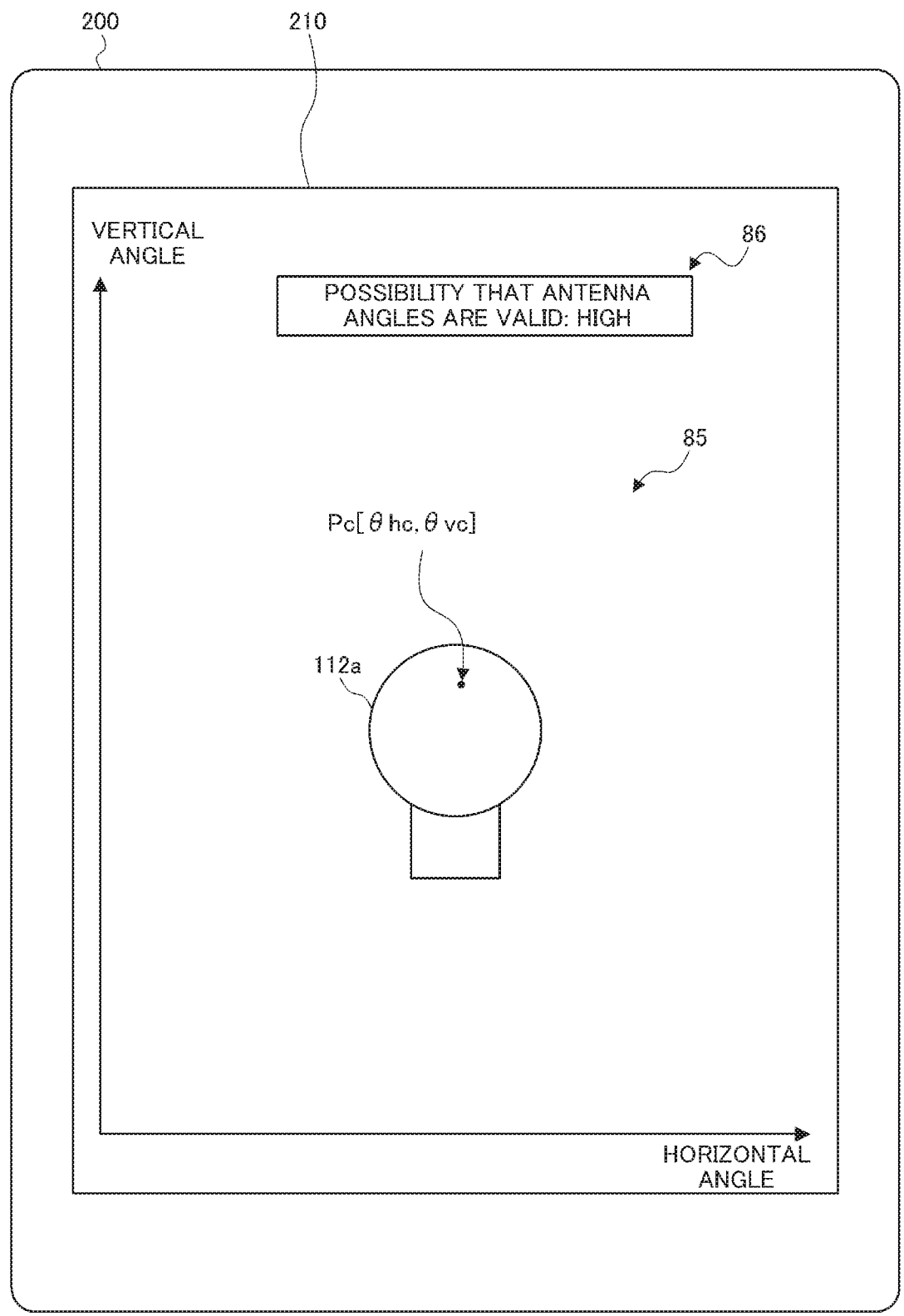
FIG. 11 is a diagram showing an example of a camera image displayed on the image generating apparatus according to the first example embodiment.
Figure 12:
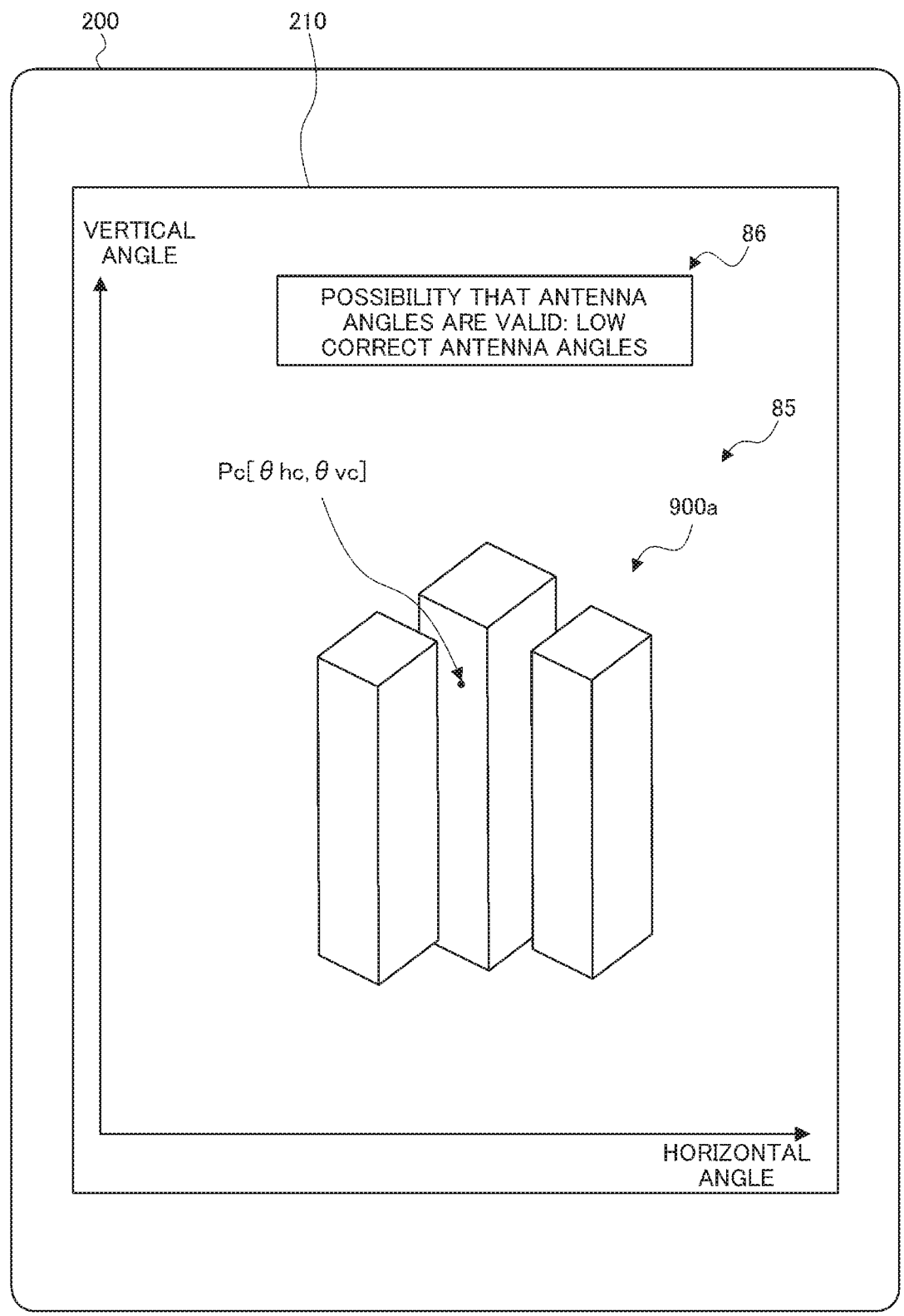
FIG. 12 is a diagram showing an example of the camera image displayed on the image generating apparatus according to the first example embodiment.

FIGS. 11 and 12 are diagrams showing an example of a camera image 85 displayed on the image generating apparatus 200 according to the first example embodiment. In FIGS. 11 and 12, the display unit 210 displays the camera image 85. Note that as shown in FIGS. 11 and 12, in the first example embodiment, only the camera image 85 may be displayed on the display unit 210, and the antenna adjustment image 70 may not be displayed thereon.

Note that like the case of the antenna adjustment image 70, in the camera image 85, the horizontal direction (the horizontal axis in the two-dimensional coordinate system) indicates an angle in the horizontal direction (horizontal angle), and the vertical direction (the vertical axis in the two-dimensional coordinate system) indicates an angle in the vertical direction (vertical angle). Further, since the camera 180 photographs the direction in which the antenna 110 faces, the position Pc (current position Pc) corresponding to the current antenna angles [θhc, θvc] can be near the center of the display unit 210. Note that the current antenna angles correspond to the antenna angles adjusted in the step of the antenna angle adjustment (Step S100). That is, the center of the camera image 85 can roughly coincide with the current position Pc (adjusted antenna angles). Further, the ranges of the horizontal angle and the vertical angle in the camera image 85 are configured to completely or roughly coincide with the respective ranges of the horizontal angle and the vertical angle in the antenna adjustment image 70.

The camera image 85 shown in FIG. 11 includes an antenna image 112a of the antenna 112 of the opposite station 102. Accordingly, in the example shown in FIG. 11, the direction determination unit 254 determines that the adjusted antenna angles are valid. The display unit 210 then displays a message 86 indicating that the possibility that the adjusted antenna angles are valid is high. In contrast to this, the camera image 85 shown in FIG. 12 includes an obstacle image 900a showing the obstacle 900, and does not include the antenna image 112a of the antenna 112. Accordingly, in the example shown in FIG. 12, the direction determination unit 254 determines that the adjusted antenna angles are not valid. The display unit 210 then displays a message 86 indicating that the possibility that the adjusted antenna angles are valid is low and that a user is prompted to correct the antenna angles.

As described above, even when the antenna 110 is adjusted by using only the camera image so as to face the vicinity of the center of the antenna 112 of the opposite station 102, the reception quality does not necessarily become the highest due to causes such as diffraction. Therefore, in a method using only a camera image, it is difficult to adjust an antenna in the most appropriate direction. Further, when antenna angles are merely adjusted by using the antenna adjustment image 70, they may be incorrectly adjusted in a direction of a reflected wave in the obstacle 900 in the case where the reception quality of the reflection wave in the obstacle 900 is high to some extent. To be specific, in the step of the antenna angle adjustment (Step S100), when a user adjusts the antenna angles so as to set the current angle mark at the point [θht, θvt] at the center of the region 72r in the antenna adjustment image 70, the region 72r may actually correspond to a direction in which the reception quality of the reflected wave in the obstacle 900 is highest. In this case, the user may set the direction of the antenna 110 to the direction of the reflected wave from the obstacle 900.

In contrast to this, in the first example embodiment, the antenna angles are adjusted by using both of the antenna adjustment image 70 and the camera image 85, and thereby the validity thereof adjusted by using the antenna adjustment image 70 can be determined. Accordingly, an antenna can be easily and accurately adjusted in the most appropriate direction by using the image generating apparatus 200 according to the first example embodiment.

Figure 13:
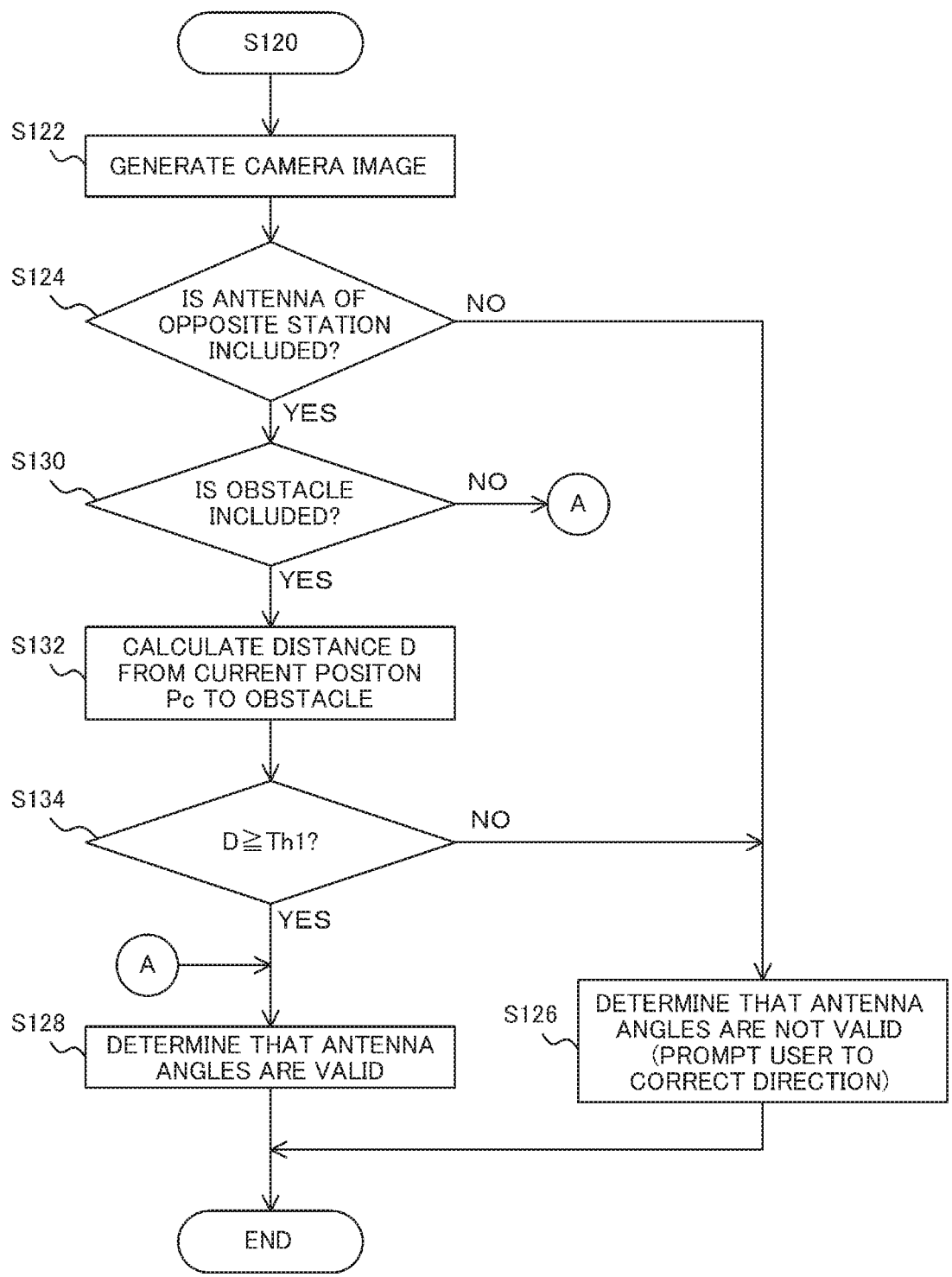
FIG. 13 is a flowchart showing a modified example of a step of the antenna angle determination according to the first example embodiment.

FIG. 13 is a flowchart showing a modified example of the step of the antenna angle determination (Step S120) according to the first example embodiment. In the modified example shown in FIG. 13, the case where the camera image 85 includes both of the antenna image 112a and the obstacle image 900a is taken into consideration.

Figure 14:
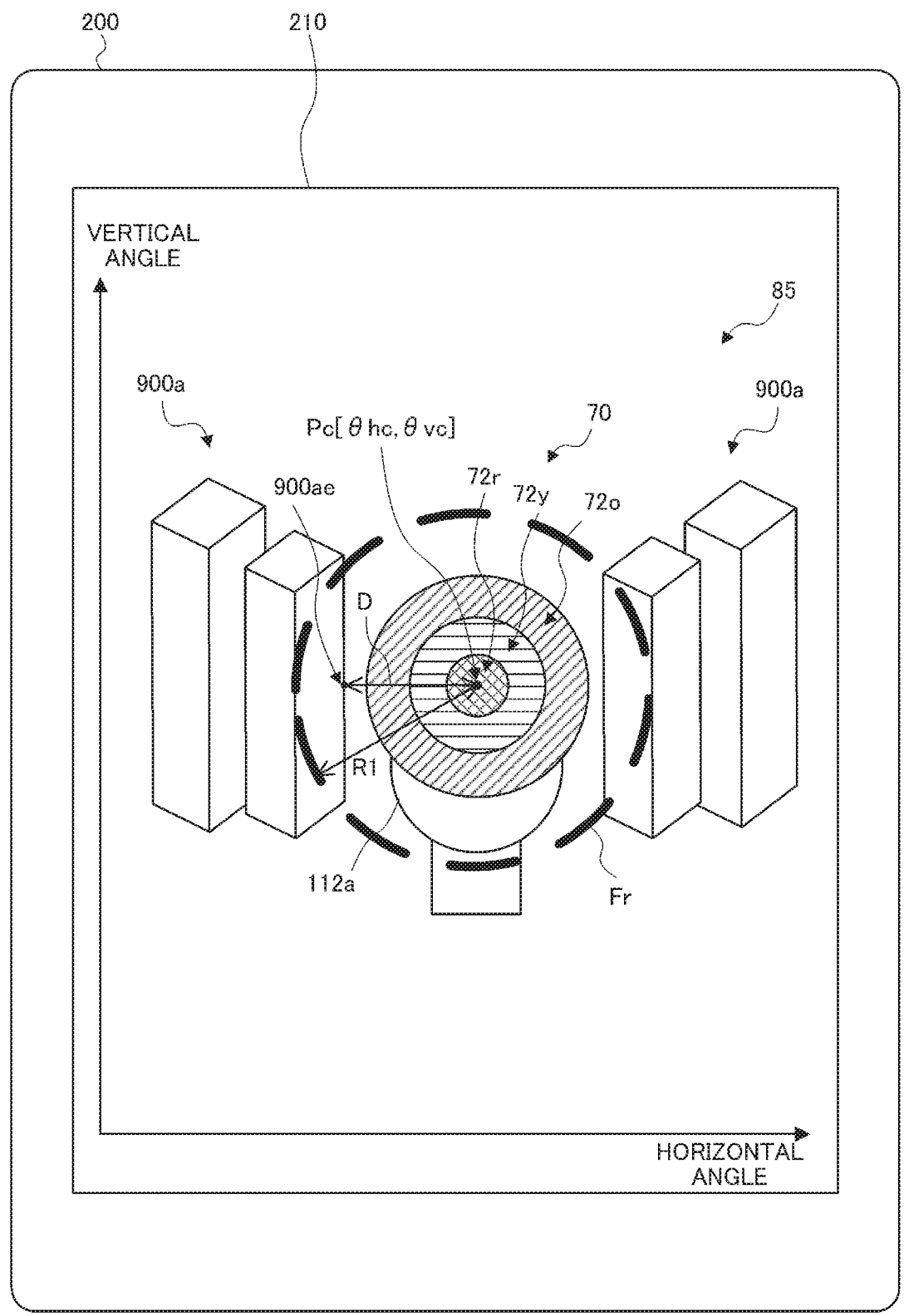
FIG. 14 is a diagram showing an example of the camera image displayed on the image generating apparatus according to the modified example according to the first example embodiment.

Further, FIG. 14 is a diagram showing an example of the camera image 85 displayed on the image generating apparatus 200 according to the modified example according to the first example embodiment. In FIG. 14, the display unit 210 displays the camera image 85. The camera image 85 includes the antenna image 112a and the obstacle image 900a. Note that in the example shown in FIG. 14, the display unit 210 displays the antenna image 70, but may not display the same. Further, a bold broken line indicates an outer circumference circle Fr of the Fresnel zone 96 at a position of the distance d1 from the wireless communication apparatus 100 toward the opposite station 102. Further, a value corresponding to a radius of the outer circumference circle Fr in the camera image 85 is defined as R1. This will be described in detail later.

The camera image generating unit 252 generates the camera image 85 (Step S122). Next, the direction determination unit 254 determines whether the antenna image 112a of the opposite station 102 is included in the camera image 85 (Step S124), and if the antenna image 112a is not included therein (No in Step S124), the direction determination unit 254 determines that the adjusted antenna angles are not valid (Step S126).

On the other hand, if the antenna image 112a is included in the camera image 85 (Yes in Step S124), the direction determination unit 254 determines whether the obstacle image 900a is included in the camera image 85 (Step S130). Note that the determination whether the obstacle image 900a is included in the camera image 85 may be performed by recognizing the obstacle image 900a from the camera image 85, for example, by using image recognition techniques. In this case, the direction determination unit 254 may recognize an image corresponding to an object positioned in front of the antenna 112 of the opposite station 102, that is, an object between the antenna 110 of the wireless communication apparatus 100 and the antenna 112 of the opposite station 102 as the obstacle image 900a.

Note that the determination whether an object included in the camera image 85 is positioned in front of the antenna 112 of the opposite station 102 is performed by determining whether the distance d1 from the antenna 110 of the wireless communication apparatus 100 to the object is shorter than the link distance d. Further, a measurement of the distance d1 may be performed, for example, by the camera 180 focusing on the object, or by using a three-dimensional camera, laser distance-measuring techniques, or the like.

When the obstacle 900a is not included in the camera image 85 (No in Step S130), the direction determination unit 254 determines that the adjusted antenna angles are valid (Step S128). On the other hand, the obstacle 900a is included in the camera image 85 (Yes in Step S130), the direction determination unit 254 calculates a distance D from the current position Pc to the obstacle 900a in the camera image 85 (Step S132). Note that the distance D does not necessarily mean a "length" between two points in the actual space, and may instead mean a view angle difference between two points in the camera image 85. That is, the distance D means a difference between the current position Pc (the position corresponding to the adjusted antenna angles) and the position of the obstacle image 900a in the camera image 85.

To be specific, the direction determination unit 254 determines an edge 900ae of the obstacle image 900a closest to the current position Pc in the camera image 85. The direction determination unit 254 then calculates the distance D from the current position Pc to the edge 900ae. Note that when it is assumed that the position of the edge 900ae is [θhe, θve], the distance D can be expressed by the following expression 3.

$$D=\sqrt{\{(\theta he-\theta hc)^2+(\theta ve-\theta vc)^2\}} \quad \text{(Expression 3)}$$

Note that the direction determination unit 254 calculates the distance D from the current position Pc to the obstacle image 900a in the camera image 85, but the present invention is not limited thereto. The direction determination unit 254, if possible, may calculate a distance from a straight line extending in a direction in which the antenna 110 faces from the center thereof to the obstacle 900 by using the camera image 85.

Next, the direction determination unit 254 determines whether the distance D is equal to or larger than a predetermined threshold value Th1 (Step S134). Note that the threshold value Th1 can be determined according to the Fresnel radius and expressed by the following expression 4.

$$Th1=c1*R1 \quad \text{(Expression 4)}$$

Note that c1 is a predetermined constant, and for example, $0 < c1 \leq 1$ may hold.

Further, when it is assumed that a distance from the antenna 110 to the obstacle 900 is the distance d1, R1=θf may hold in the camera image 85 shown in FIG. 14 based on the expression 2. In this case, R1 can be expressed by the expression 5 based on the expressions 1 and 2.

$$R1=\tan\left[\sqrt{[\lambda*\{d1*(d-d1)\}/d]/d1}\right] \quad \text{(Expression 5)}$$

When the distance D is equal to or larger than the threshold value Th1 (Yes in step S134), the direction determination unit 254 determines that the obstacle 900 is separated from a transmission path of radio waves (a straight line extending in a direction where the antenna 110 faces from the center thereof) to such an extent that the reception quality is not affected. The direction determination unit 254 therefore determines that the adjusted antenna angles are valid (Step S128). On the other hand, when the distance D is shorter than the threshold value Th1 (No in Step S134), the direction determination unit 254 determines that the object 900 may affect the communication quality. The direction determination unit 254 therefore determines that the adjusted antenna angles are not valid (Step S126).

Thus, in the modified example according to the first example embodiment, the case where the obstacle image 900a is included in the camera image 85 is taken into consideration. As described above, when the ratio of the obstacle 900 existing in the Fresnel zone 96 is large, the reception quality may be lower. Accordingly, an antenna can be further adjusted in the most appropriate direction by using the image generating apparatus 200 according to the modified example according to the first example embodiment.

Second Example Embodiment

A second example embodiment is described hereinafter. In the second example embodiment, the hardware configuration of the communication system 50 is the one shown in FIG. 4, which is the same as that in the first example embodiment. On the other hand, in the second example embodiment, the function of the image generating apparatus 200 is different from that in the first example embodiment. To be specific, the second example embodiment is different from the first example embodiment in that the color allocation table is not stored in advance. To be more specific, in the second example embodiment, a step of determining the color allocation table is added before the processing of the step S102 in the flowchart of FIG. 7. Further, in the second example embodiment, not only the camera image 85 but also the antenna adjustment image 70 is used in the steps of the antenna angle determination. Details will be described below.

Figure 15:
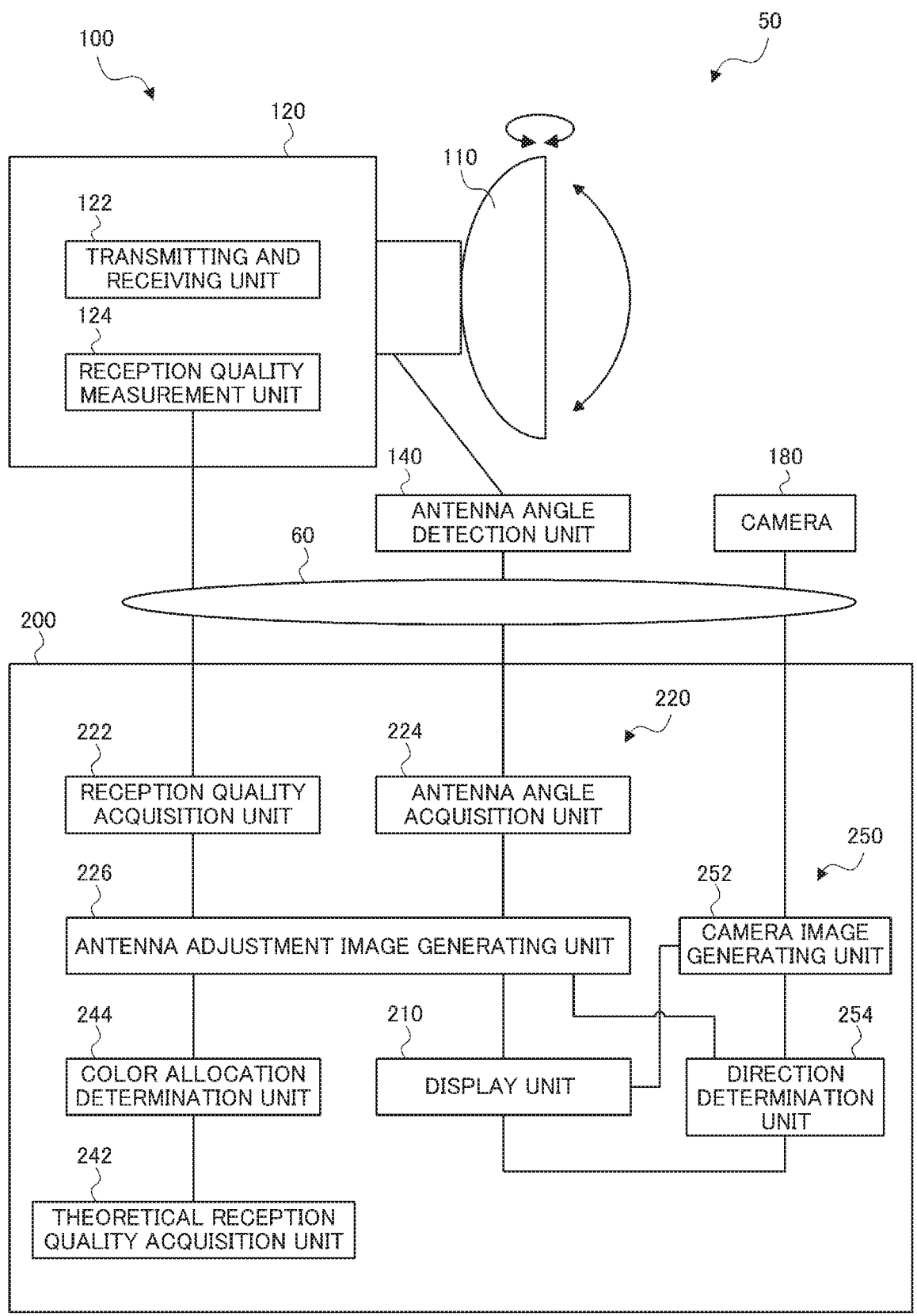
FIG. 15 is a functional block diagram showing a hardware configuration of the communication system according to a second example embodiment.

FIG. 15 is a functional block diagram showing a hardware configuration of the communication system 50 according to the second example embodiment. The function of the wireless communication apparatus 100 is the same as that in the first example embodiment. Further, the antenna adjustment image processing unit 220 of the image generating apparatus 200 includes the reception quality acquisition unit 222, the antenna angle acquisition unit 224, the antenna adjustment image generating unit 226, a theoretical reception quality acquisition unit 242, and a color allocation determination unit 244. The camera image processing unit 250, the reception quality acquisition unit 222 and the antenna angle acquisition unit 224 are substantially the same as those in the first example embodiment, and the description thereof is omitted.

The theoretical reception quality acquisition unit 242 acquires a theoretical value of the quality of a received signal (theoretical reception quality value) from a known value or the like. Note that, although a method for calculating the theoretical reception quality value when the quality of a received signal is received power (received signal level) is described by way of illustration in the following description, the theoretical reception quality value can be calculated in the same way when the quality of a received signal is another parameter (for example, SNR). Note that the theoretical reception quality acquisition unit 242 may acquire the theoretical reception quality value as a result that the theoretical reception quality value calculated by a user is input to the operation unit 208. In contrast, the theoretical reception quality acquisition unit 242 may calculate the theoretical reception quality value by arithmetic processing performed by the control unit 202 of the image generating apparatus 200.

The theoretical reception quality value in the case where the quality of a received signal is received power, which is a theoretical value of received power, is defined as Prx [dBm], the following expression 6 holds.

$$Prx=Ptx-Lt+Gt-L+Gr-Lr \text{ [dBm]} \quad \text{(Expression 6)}$$

Note that Ptx [dBm] is the transmission power of a transmitter, which is the opposite station 102. Further, Lt [dB] is a transmission supplying loss of the opposite station 102. Gt [dB] is a transmission antenna gain of the opposite station 102. L [dB] is a propagation loss from the opposite station 102 to the wireless communication apparatus 100. Gr [dB] is a reception antenna gain of the wireless communication apparatus 100. Lr [dB] is a reception supplying loss of the wireless communication apparatus 100.

The propagation loss L is expressed by the following expression 7.

$$L = 10 * \log(4\pi d/\lambda)^2 \text{ [dB]} \quad \text{(Expression 7)}$$

The color allocation determination unit 244 determines color allocation by using the theoretical reception quality value acquired by the theoretical reception quality acquisition unit 242. Note that the theoretical reception quality value can be regarded as the maximum value which the reception quality value can take. Then, the color allocation determination unit 244 allocates the color indicating the highest quality to the range including the theoretical reception quality value. Stated differently, the color allocation determination unit 244 allocates the color indicating the highest quality to the range of the quality corresponding to the theoretical reception quality value. Further, the color allocation determination unit 244 may allocate the color so that the color representation is more precise for the reception quality information indicating the quality close to the theoretical reception quality value than for the reception quality information indicating the quality far from the theoretical reception quality value.

FIG. 16 is a diagram showing an example of the color allocation table according to the second example embodiment. Although the color indicating the highest quality is red in the color allocation table shown in FIG. 8, the color indicating the highest quality is bright red in the color allocation table shown in FIG. 16. The color allocation determination unit 244 determines the color allocation table, for example, illustrated in FIG. 16 by using the theoretical reception quality value. Further, in FIG. 16, Qmax indicates the maximum reception quality value, which is the theoretical reception quality value.

In the example of FIG. 16, the color allocation determination unit 244 determines the reception quality values Qi to Qn, which serve as the boundaries of color representation. Qmax>Qi>Qj>Qk>Ql>Qm>Qn holds in this example. Then, the color allocation determination unit 244 allocates the color representation indicating the corresponding quality to the range between the boundary values. To be specific, the color allocation determination unit 244 allocates bright red color to the range where the reception quality value is equal to or more than Qi and equal to or less than Qmax. Further, the color allocation determination unit 244 allocates red color to the range where the reception quality value is equal to or more than Qj and less than Qi. The color allocation determination unit 244 allocates orange color to the range where the reception quality value is equal to or more than Qk and less than Qj. The color allocation determination unit 244 allocates yellow color to the range where the reception quality value is equal to or more than Ql and less than Qk. The color allocation determination unit 244 allocates yellow-green color to the range where the reception quality value is equal to or more than Qm and less than Ql. The color allocation determination unit 244 allocates green color to the range where the reception quality value is equal to or more than Qn and less than Qm. The color allocation determination unit 244 allocates blue color to the range where the reception quality value is less than Qn.

In the example of FIG. 16, the width of the range of the reception quality value to which each color is allocated is not necessarily fixed. To be specific, the width "Qmax-Qi" of the range to which "bright red color" is allocated may be the narrowest, and the width "Qi-Qj" of the range to which "red color" indicating the next highest quality is allocated may be the second narrowest. In contrast, the width "Qn≤Qm" of the range to which "green color" indicating the relatively low quality may be wider than "Qmax-Qi" and "Qi-Qj". In this manner, in the antenna adjustment image, the reception quality information indicating the quality close to the theoretical reception quality value is plotted with more precise color representation compared with the reception quality information indicating the quality far from the theoretical reception quality value.

The antenna adjustment image generating unit 226 generates the antenna adjustment image by using the color allocation table determined by the color allocation determination unit 244. Note that the processing of generating the antenna adjustment image by the antenna adjustment image generating unit 226 is substantially the same as that in the first example embodiment, and the description thereof is omitted.

Figure 17:
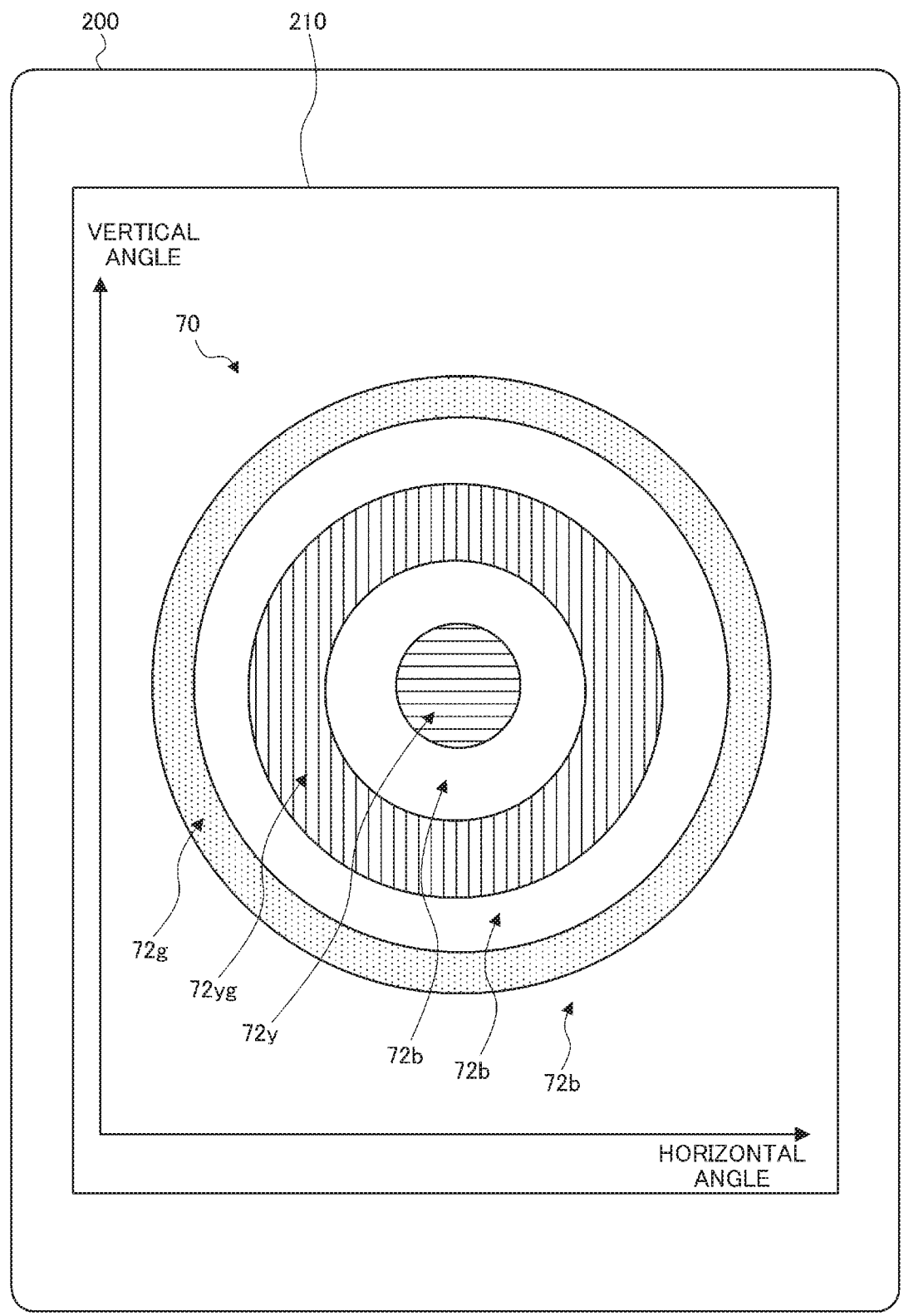
FIG. 17 is a diagram showing a first example of the antenna adjustment image displayed on the image generating apparatus according to the second example embodiment.

FIG. 17 is a diagram showing a first example of the antenna adjustment image displayed on the image generating apparatus 200 according to the second example embodiment. The first example shows the case where some abnormality is occurring in the reception from the opposite station 102. For example, it is the case where the opposite station 102 faces downward and therefore the wireless communication apparatus 100 receives a reflected wave from the earth, not a direct wave, from the opposite station 102. Note that in this case, it is assumed that the reception quality value of a received signal due to abnormality is smaller than the reception quality value of a normal received signal.

In the example of FIG. 17, in the antenna adjustment image 70, the region 72y indicated by yellow color is located near the center. Further, in the antenna adjustment image 70, the region 72yg indicated by yellow-green color is located outside the region 72y. Further, in the antenna adjustment image 70, the region 72g indicated by green color is located outside the region 72yg. Furthermore, in the antenna adjustment image 70, the region 72b indicated by blue color is located between the region 72y and the region 72yg, between the region 72yg and the region 72g, and outside the region 72g.

In the antenna adjustment image 70 shown in FIG. 17, the region indicating the highest quality is the region 72y. Note that the region 72y indicates the antenna angles corresponding to the reception quality information in the range where the reception quality value is equal to or more than Ql and less than Qk. The range of the reception quality information is significantly smaller than the theoretical reception quality value. Specifically, if communications with the opposite station 102 are normal, the region indicating the highest quality is supposed to indicate bright red color (or red color, or orange color) in the antenna adjustment image 70.

Therefore, a user can estimate that this antenna adjustment image 70 corresponds to an abnormal received signal such as a reflected wave from the earth or the obstacle 900. The user can thereby take measures such as checking the antenna direction of the opposite station 102 or checking whether there is no abnormality in the transmission path of radio waves between the wireless communication apparatus 100 and the opposite station 102.

Figure 18:
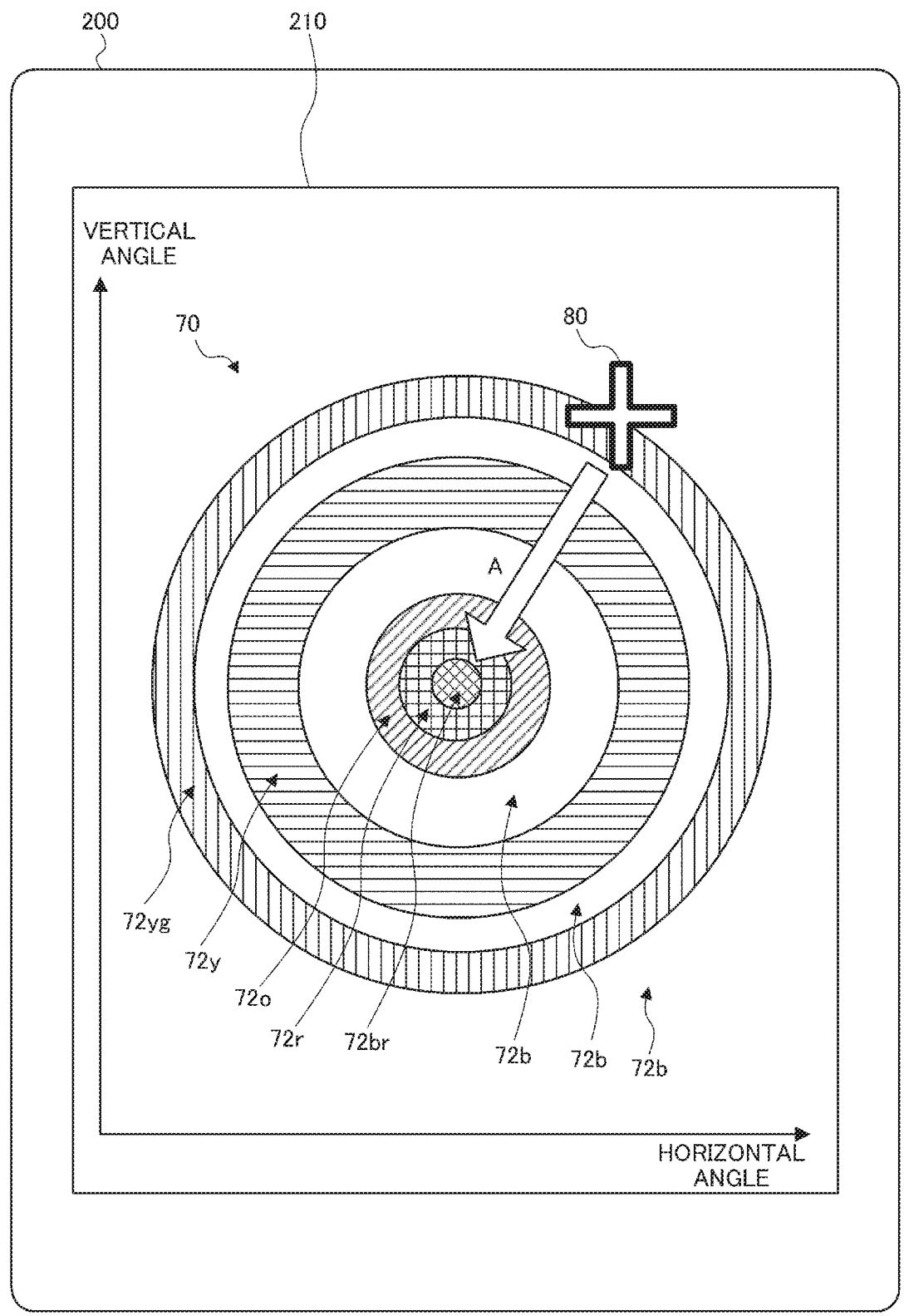
FIG. 18 is a diagram showing a second example of the antenna adjustment image displayed on the image generating apparatus according to the second example embodiment.

FIG. 18 is a diagram showing a second example of the antenna adjustment image displayed on the image generating apparatus 200 according to the second example embodiment. The second example shows the case where a radio wave is normally received from the opposite station 102. Note that the antenna adjustment image 70 shown in FIG. 18 corresponds to the antenna adjustment image 70 shown in FIG. 9. Specifically, the antenna adjustment image 70 shown in FIG. 18 shows the correspondence between the antenna angles and the reception quality information in the antenna adjustment image 70 shown in FIG. 9 by the method according to the second example embodiment.

In the example of FIG. 18, in the antenna adjustment image 70, the region 72br indicated by bright red color is located near the center. Further, in the antenna adjustment image 70, the region 72r indicated by red color is located outside the region 72br. In the antenna adjustment image 70, the region 72o indicated by orange color is located outside the region 72r. In the antenna adjustment image 70, the region 72y indicated by yellow color is located outside the region 72o. In the antenna adjustment image 70, the region 72yg indicated by yellow-green color is located outside the region 72y. In the antenna adjustment image 70, the region 72b indicated by blue color is located between the region 72o and the region 72y, between the region 72y and the region 72yg, and outside the region 72yg.

Note that in FIG. 18, the quality of a received signal is highest at the position corresponding to the region 72br, the quality of a received signal is second highest at the position corresponding to the region 72r, and the quality of a received signal is third highest at the position corresponding to the region 72o. Further, the region 72br, the region 72r and the region 72o are continuous. Specifically, in FIG. 18, the antenna angles corresponding to the region 72br, the region 72r and the region 72o can correspond to the main lobe 92. The point at which the reception quality value is highest, which is the most appropriate direction, is estimated as the point near the center of the region 72br.

Then, in FIG. 18, the reception quality information related to the angle corresponding to the main lobe 92 is represented by precise color representation. To be specific, in FIG. 9, the reception quality information related to the angle corresponding to the main lobe 92 is represented only by one color, which is red. On the other hand, in FIG. 18, the reception quality information related to the angle corresponding to the main lobe 92 is represented precisely by three colors, which are bright red, red and orange. Stated differently, in the second example embodiment, the accuracy of display in close proximity to the theoretical reception quality value (the maximum value of the reception quality value) is high. Further, the size of the region 72br in FIG. 18 is smaller than the size of the region 72r in FIG. 9. Therefore, as compared with the case of using the antenna adjustment image 70 shown in FIG. 9, a user can easily set the current angle mark 80 in the most appropriate direction (which is the point near the center of the region 72br) as indicated by the arrow A.

Further, in the first example embodiment, when the setting of color allocation in the preset color allocation table is not appropriate, the level of the reception quality value is not appropriately represented in some cases in the antenna adjustment image. For example, when Qc in FIG. 8 is greater than the theoretical reception quality value, the antenna adjustment image is blue all over the image, and a user cannot find the angle corresponding to the main lobe 92. On the other hand, in the second example embodiment, because the color indicating the highest reception quality value is allocated in accordance with the theoretical reception quality value, it is possible to appropriately determine the angle corresponding to the main lobe 92.

Figure 19:
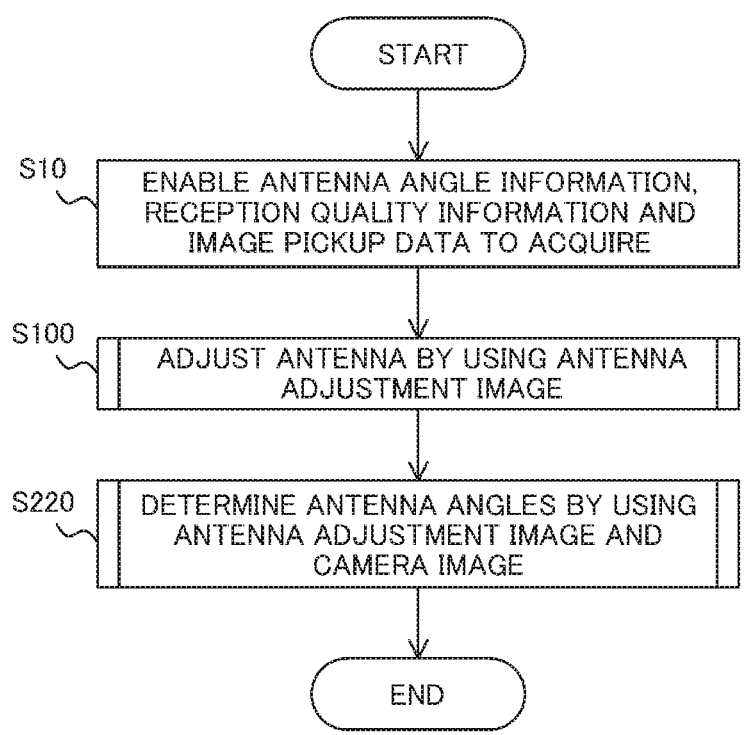
FIG. 19 is a flowchart showing an antenna adjustment method according to the second example embodiment.

FIG. 19 is a flowchart showing an antenna adjustment method according to the second example embodiment. First, as described above, the image generating apparatus 200 is installed so as to be able to acquire the antenna angle information, the reception quality information, and the image pickup data (Step S10). Next, in Steps S100 and S220, the antenna angle determination is performed. To be specific, as described above, in Step S100, the antenna angle adjustment is performed by using the antenna adjustment image (the step of the antenna angle adjustment). Further, in Step S220, the validity of the adjusted antenna angles is determined by using the antenna adjustment image and the camera image (the step of the antenna angle determination). Note that the steps of the antenna angle adjustment are substantially the same as the processing shown in FIG. 7 other than the addition of a step of determining the color allocation table before the processing of Step S102 in FIG. 7, and the description thereof is omitted.

Figure 20:
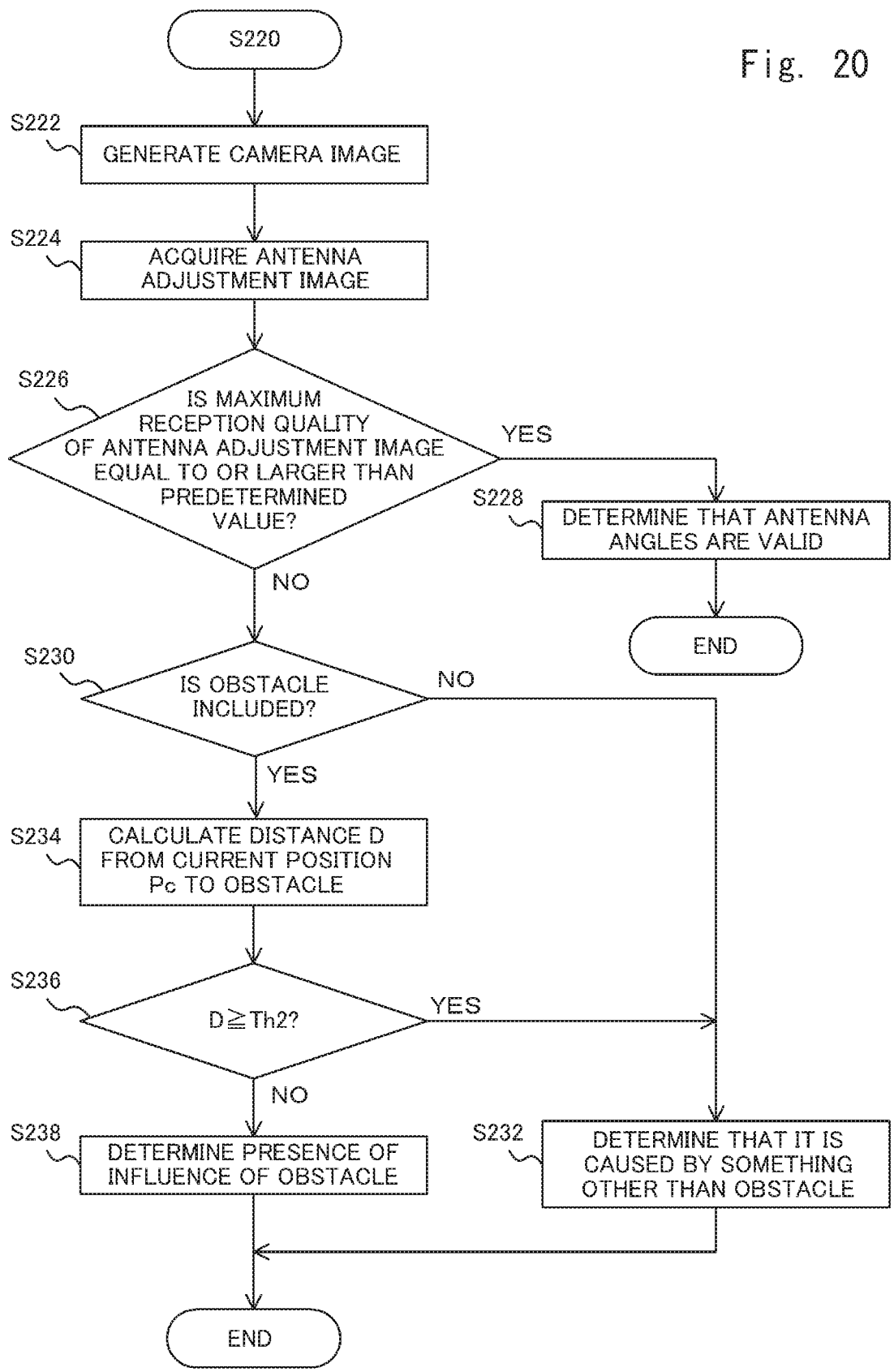
FIG. 20 is a flowchart showing a step of the antenna angle determination according to the second example embodiment.

FIG. 20 is a flowchart showing the step of the antenna angle determination (Step S220) according to the second example embodiment. In the step of the angle adjustment determination according to the second example embodiment, the determination of the presence or the absence of an influence of the obstacle 900 in the case where the antenna angles are not valid can be performed.

Figure 21:
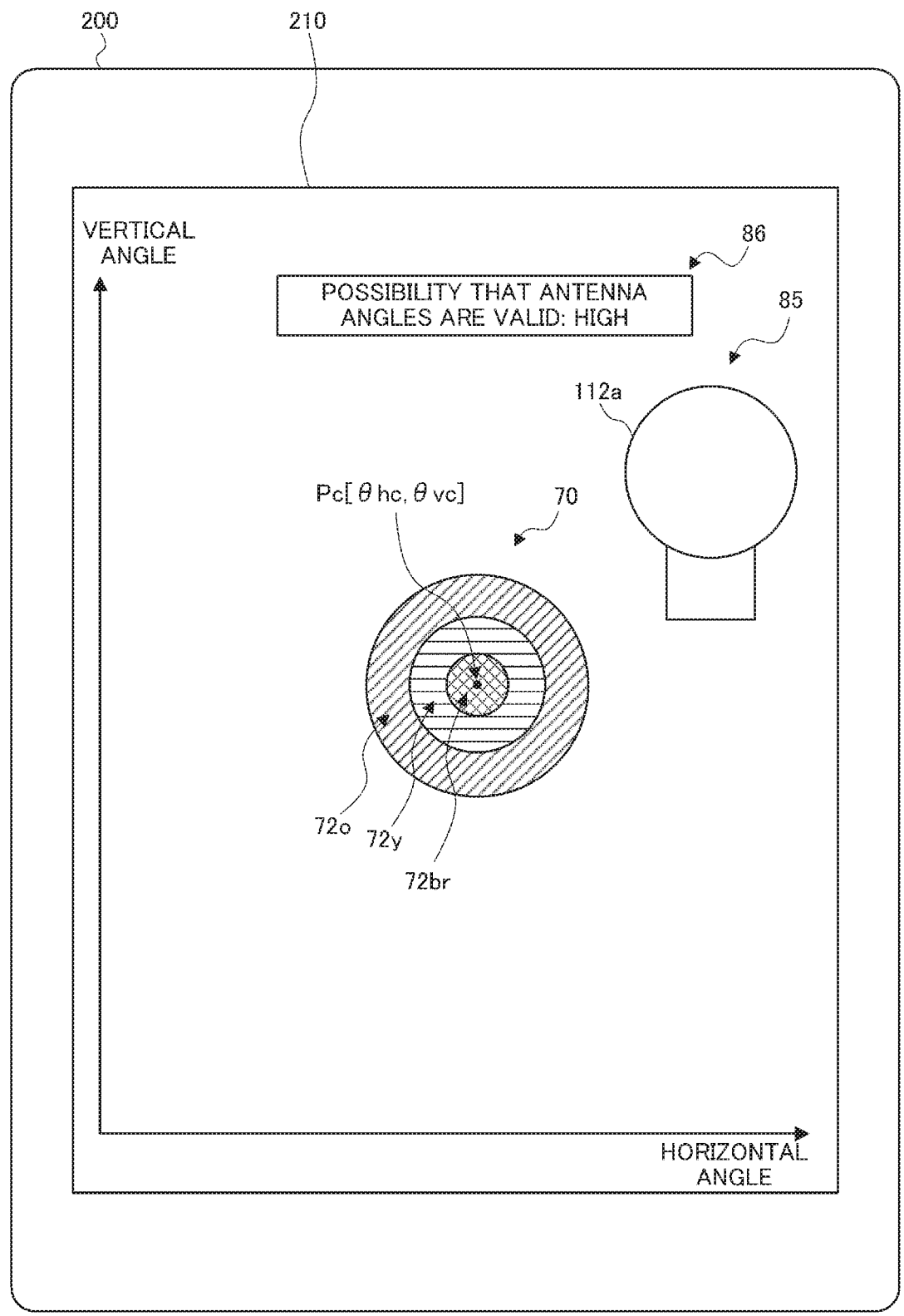
FIG. 21 is a diagram showing an example of the antenna adjustment image and the camera image displayed on the image generating apparatus according to the second example embodiment.
Figure 22:
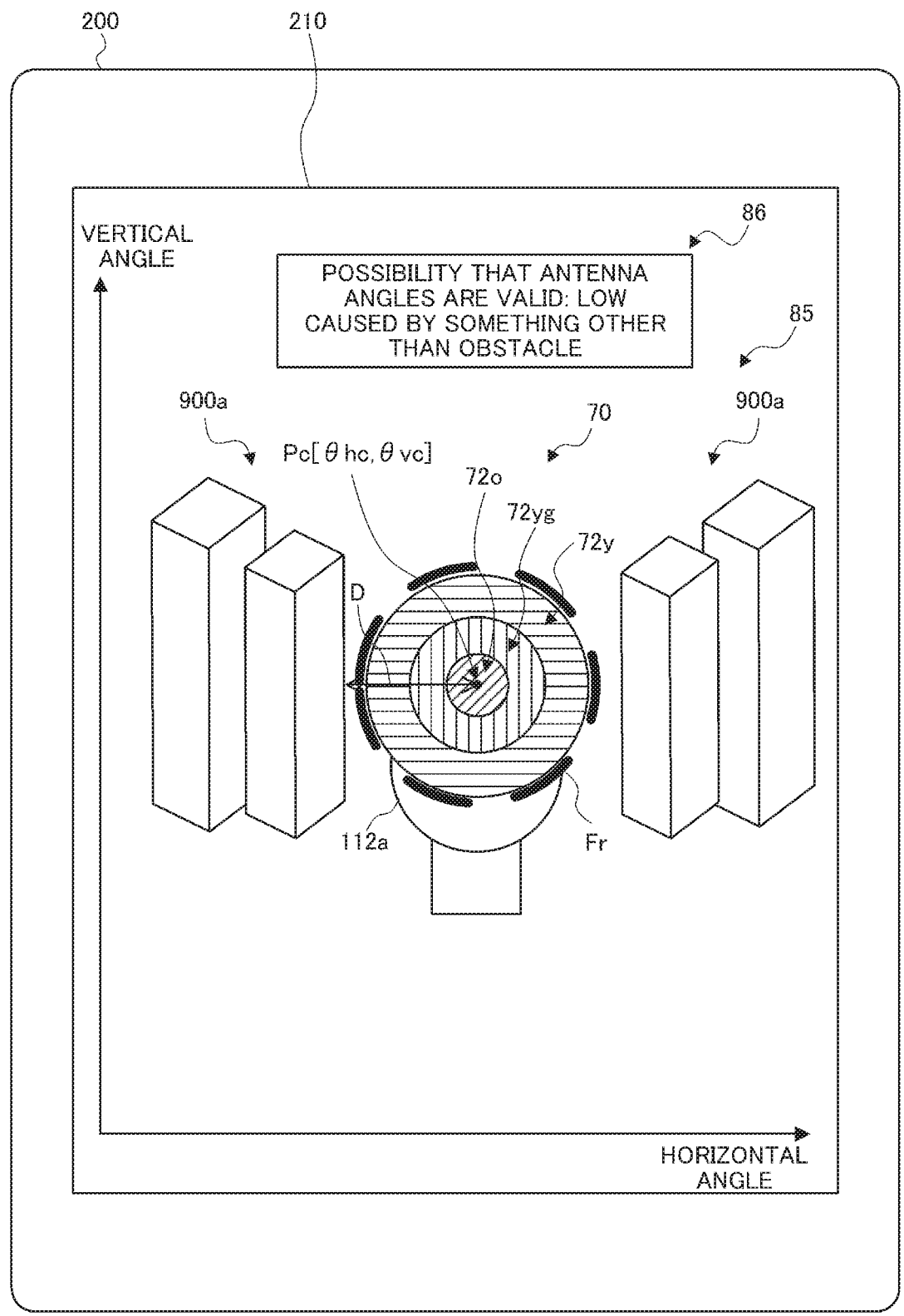
FIG. 22 is a diagram showing an example of the antenna adjustment image and the camera image displayed on the image generating apparatus according to the second example embodiment.

FIGS. 21 and 22 are diagrams showing an example of the antenna adjustment image 70 and the camera image 85 displayed on the image generating apparatus 200 according to the second example embodiment. In FIGS. 21 and 22, the display unit 210 displays the antenna adjustment image 70 and the camera image 85.

Note that as shown in FIGS. 21 and 22, the position Pc (current position Pc) corresponding to the current antenna angles [θhc, θvc] is near the center of the display unit 210 like in the first example embodiment. Note that the current antenna angles correspond to the antenna angles adjusted in the step of the antenna angle adjustment (Step S100). That is, the center of the camera image 85 can roughly coincide with the current position Pc (adjusted antenna angles). Further, the ranges of the horizontal angle and the vertical angle in the camera image 85 completely or roughly coincide with the respective ranges of the horizontal angle and the vertical angle in the antenna adjustment image 70.

The camera image generating unit 252 generates the camera image 85 (Step S222). Further, the direction determination unit 254 acquires the antenna adjustment image 70 from the antenna adjustment image generating unit 226 (Step S224). Next, the direction determination unit 254 determines whether a region indicating the highest reception quality in the antenna adjustment image 70 indicates the reception quality equal to or larger than a predetermined value (Step S226). Specifically, the direction determination unit 254 determines whether the region indicating the highest reception quality in the antenna adjustment image 70 indicates the theoretical reception quality value or the quality close to the theoretical reception quality value. That is, the direction determination unit 254 determines whether the antenna adjustment image 70 includes the color indicating the highest reception quality (bright red in the example of FIG. 16). In other words, in the example of FIG. 16, the direction determination unit 254 determines whether the highest reception quality indicated in the antenna adjustment image 70 is equal to or larger than Qi (a first value) which is the lower limit value of the region indicating the highest quality. Specifically, the direction determination unit 254 determines whether the highest reception quality indicated in the antenna adjustment image 70 is equal to or larger than the predetermined first value.

When the antenna adjustment image 70 includes the color indicating the highest reception quality, that is, when the region indicating the highest reception quality in the antenna adjustment image 70 indicates the reception quality equal to or larger than the predetermined value (Yes in Step S226), the direction determination unit 254 determines that the adjusted antenna angles are valid (Step S228). Then, the direction determination unit 254 can control the display unit 210 so as to display the result of the determination that the adjusted antenna angles are valid.

The display unit 210 shown in FIG. 21 displays the antenna image 112a of the opposite station 102 at a position relatively away from the current position Pc and the antenna adjustment image 70. However, the region 72br indicating that the quality of the received signal is the highest is displayed near the center of the antenna adjustment image 70. That is, in the example of FIG. 21, the antenna adjustment image 70 includes the color indicating the highest reception quality. The case like the example of FIG. 21 can be occurred, for example, when the reception quality becomes high even if the antenna angles do not face the antenna 112 of the opposite station 102 due to causes such as diffraction. In this case, the reception quality can be the highest at antenna angles at which the antenna image 112a deviates from the current position Pc.

In FIG. 21, although the antenna image 112a deviates from the current position Pc, the reception quality in the current position Pc (adjusted antenna angles) is close to the theoretical reception quality value. Accordingly, the direction determination unit 254 determines that the adjusted antenna angles are valid. Then, the display unit 210 can display the message 86 indicating that the possibility that the adjusted antenna angles are valid is high. With such a configuration, a user can recognize that the adjusted antenna angles are valid even when the antenna angles do not face the antenna 112 of the opposite station 102. Therefore, as compared with the first example embodiment, an antenna can be further easily and accurately adjusted in the most appropriate direction by using the image generating apparatus 200 according to the second example embodiment.

Note that in FIG. 21, although the obstacle image 900a is not shown, there is no difference even when the obstacle image 900a is shown. Specifically, even when the obstacle image 900a is shown, the adjusted antenna angles may be determined to be valid if the antenna adjustment image 70 includes the region 72br indicating that the quality of the received signal is the highest. The same applies even when the antenna image 112a is not shown. Specifically, even when the antenna image 112a is not shown, the adjusted antenna angles may be determined to be valid if the antenna adjustment image 70 includes the region 72br indicating that the quality of the received signal is the highest.

On the other hand, when the antenna adjustment image 70 does not include the color indicating the highest reception quality, that is, when the region indicating the highest reception quality in the antenna adjustment image 70 does not indicate the reception quality equal to or larger than the predetermined value (No in Step S226), the direction determination unit 254 determines that the adjusted antenna angles are not valid. In the same manner as the processing of Step S130, the direction determination unit 254 then determines whether the obstacle image 900a is included in the camera image 85 (Step S230).

When the obstacle image 900a is not included in the camera image 85 (No in Step S230), the direction determination unit 254 determines that the communication quality for the wireless communication apparatus 100 to communicate with the opposite station 102 may be insufficient due to causes other than the obstacle 900 (Step S232). At this time, the direction determination unit 254 can control the display unit 210 so as to display the result of the determination that the adjusted antenna angles are not valid and this is caused by something other than the obstacle 900.

On the other hand, when the obstacle image 900a is included in the camera image 85 (Yes in Step S230), in the same manner as the processing of Step S132, the direction determination unit 254 calculates a distance D from the current position Pc to the obstacle 900a in the camera image 85 (Step S234). Next, in the same manner as that of the processing of Step S134, the direction determination unit 254 determines whether the distance D is equal to or larger than a predetermined threshold value Th2 (Step S236). Note that the threshold value Th2 used in this example can be expressed by the following expression 8.

$$Th2 = c2 * R1 \quad \text{(Expression 8)}$$

Note that c2 is a predetermined constant, and for example, $0 < c2 \leq 1$ may hold. Further, $c2 = c1$ may hold. In this case, $Th2 = Th1$ holds.

When the distance D is equal to or larger than the threshold value Th2 (Yes in Step S236), the direction determination unit 254 determines that the obstacle 900 is separated from a transmission path of radio waves to such an extent that the reception quality is not affected. Accordingly, the direction determination unit 254 determines that the communication quality for the wireless communication apparatus 100 to communicate with the opposite station 102 may be insufficient due to causes other than the obstacle 900 (Step S232). On the other hand, when the distance D is shorter than the threshold value Th2 (No in Step S236), the direction determination unit 254 determines that the communication quality for the wireless communication apparatus 100 to communicate with the opposite station 102 may be insufficient due to the influence of the obstacle 900 (Step S238). At this time, the direction determination unit 254 can control the display unit 210 so as to display the result of the determination that the adjusted antenna angles are not valid and this is caused by the obstacle 900.

The display unit 210 shown in FIG. 22 displays the antenna image 112a of the opposite station 102 at a position relatively close to the current position Pc and the antenna adjustment image 70. However, the region 72br indicating that the quality of the received signal is the highest is not displayed in the antenna adjustment image 70. The region indicating the highest reception quality in the antenna adjustment image 70 shown in FIG. 22 is the region 72o indicating third highest reception quality in the example of FIG. 16. Therefore, in this case, the direction determination unit 254 determines that the adjusted antenna angles are not valid (No in Step S226).

Since the camera image 85 shown in FIG. 22 includes the obstacle image 900a, the direction determination unit 254 determines the cause of the low communication quality according to the distance D from the current position Pc in the camera image 85 to the obstacle image 900a (Step S236). Note that FIG. 22 shows the example when the distance D is equal to or larger than the threshold value Th2, that is, when the ratio of the obstacle 900 existing in the Fresnel zone 96 is not large (Yes in Step S236). In this case, the display unit 210 can display the message 86 indicating that the possibility that the adjusted antenna angles are valid is low and this is caused by other than the obstacle 900. With such a configuration, a user can recognize that the adjusted antenna angles are not valid and this is caused by the obstacle 900 or not even when the antenna angles face the antenna 112 of the opposite station 102. Therefore, as compared with the first example embodiment, an antenna can be further easily and accurately adjusted in the most appropriate direction by using the image generating apparatus 200 according to the second example embodiment.

Modified Example

It should be noted that the present invention is not limited to the above-described example embodiments and may be varied in many ways within the scope of the present invention. For example, although the image generating apparatus 200 acquires the reception quality information, the antenna angle information, and the image pickup data through the communication channel 60 in the above-described example embodiments, the reception quality information, the antenna angle information, and the image pickup data may be acquired through physically different communication channels. Specifically, the reception quality information, the antenna angle information, and the image pickup data may be acquired through different ports in the image generating apparatus 200.

Further, although the image representation indicating the reception quality information is the color representation such as red or orange color in the above-described example embodiments, the present invention is not limited thereto. For example, the image representation may be a grayscale (black shading), a plurality of types of patterns or the like. Specifically, the image representation may be any representation where the reception quality information indicating the same quality is visually the same. Stated differently, the image representation is not limited as long as it represents the level of the quality of a received signal in a visually distinguishable manner.

Further, when the image representation is the color representation, each color representation may be represented by color in shades. It is thereby possible to represent the reception quality information more precisely in the antenna adjustment image. Further, in the color allocation table, the color value of R (Red), G (Green) and B (Blue) and the reception quality value may be made to correspond to each other without distributing the color discretely by dividing the range of the reception quality value. It is thereby possible to represent the reception quality information yet more precisely (finely) in the antenna adjustment image.

Further, when generating the antenna adjustment image, the color representation indicating the corresponding reception quality information is plotted at the position corresponding to the antenna angle each time the antenna angles are changed as shown in FIG. 7 in the above-described example embodiments; however, the present invention is not limited thereto. The quality of a received signal may be measured for each antenna angle, and the antenna angles and the reception quality information may be stored in association with each other. Then, after the measurement is done for all angles, the color representation indicating the reception quality information may be plotted for all angles at substantially the same time, and thereby the antenna adjustment image may be generated.

Further, although the wireless communication apparatus 100 and the image generating apparatus 200 are shown as separate apparatuses in FIG. 4, the wireless communication apparatus 100 and the image generating apparatus 200 may be physically integrated. In other words, the wireless communication apparatus 100 and the image generating apparatus 200 may be one apparatus. In this case, the communication channel 60 may be eliminated. The "communication system 50" according to this example embodiment includes such an apparatus as well. In other words, the wireless communication apparatus 100 (the communication apparatus) may include the image generating apparatus 200.

Further, the processing in the color allocation determination unit 244 is not necessarily implemented in the image generating apparatus 200. The processing of determining the color allocation may be performed in a different apparatus from the image generating apparatus 200 by using the calculated theoretical reception quality value. Then, the image generating apparatus 200 may acquire data of the determined color allocation table from the different apparatus.

Further, the direction determination unit 254 of the image generating apparatus 200 automatically performs the processing in Step S124 shown in FIGS. 10 and 13, but the present invention is not limited thereto. A user may visually recognize the display unit 210 to determine whether the antenna image 112a of the opposite station 102 is included in the camera image 85. Then, the user may determine that the adjusted antenna angles are valid when he/she has visually recognized that the antenna image 112a is included in the camera image 85. In this case, the image generating apparatus 200 may not include the direction determination unit 254. However, since the direction determination unit 254 automatically perform the determination, the determination by the user is not necessary. This avoids the determination of the validity of the adjusted antenna angles being influenced by the level of skill of the user. Accordingly, an antenna can be further easily and accurately adjusted in the most appropriate direction.

Further, in the steps of the angle adjustment determination shown in FIG. 13, the distance d1 from the antenna 110 to the obstacle 900 is measured, but the present invention is not limited thereto. The distance d1 may not be measured. In this case, in Step S130, a user may visually recognize the display unit 210 to determine whether the obstacle image 900a is included in the camera image 85. The display unit 210 may display the Fresnel zone 96 corresponding to the Fresnel radius r1 (maximum Fresnel radius r1) at the midpoint between the antenna 112 and the antenna 110. The user may determine whether the obstacle image 900a is included in this Fresnel zone 96 instead of the processing of Steps S132 and S134. In this case, the image generating apparatus 200 may not include the direction determination unit 254. However, since the direction determination unit 254 automatically performs the determination, the determination by the user is not necessary. This avoids the determination of the validity of the adjusted antenna angles being influenced by the level of skill of the user. Accordingly, an antenna can be further easily and accurately adjusted in the most appropriate direction. Note that the direction determination unit 254 may determine whether the obstacle image 900a is included in the above-described Fresnel zone 96 corresponding to the maximum Fresnel radius r1.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable medium. Examples of the transitory computer readable medium include electric signals, optical signals, and electromagnetic waves. The transitory computer readable media can provide the program to a computer via a wired communication line (e.g. electric wires, and optical fibers) or a wireless communication line.

This application is based upon and claims the benefit of priority from Japanese patent application No. 2016-121459 filed on Jun. 20, 2016, the disclosure of which is incorporated herein in its entirety by reference.

REFERENCE SIGNS LIST

1 IMAGE GENERATING APPARATUS
12 FIRST IMAGE GENERATING UNIT
14 SECOND IMAGE GENERATING UNIT
20 ANTENNA
50 COMMUNICATION SYSTEM
70 ANTENNA ADJUSTMENT IMAGE
85 CAMERA IMAGE
100 WIRELESS COMMUNICATION APPARATUS
102 OPPOSITE STATION
110, 112 ANTENNA
120 COMMUNICATION INSTRUMENT
122 TRANSMITTING AND RECEIVING UNIT
124 RECEPTION QUALITY MEASUREMENT UNIT
140 ANTENNA ANGLE DETECTION UNIT
180 CAMERA
200 IMAGE GENERATING APPARATUS
210 DISPLAY UNIT
220 ANTENNA ADJUSTMENT IMAGE PROCESSING UNIT
222 RECEPTION QUALITY ACQUISITION UNIT
224 ANTENNA ANGLE ACQUISITION UNIT
226 ANTENNA ADJUSTMENT IMAGE GENERATING UNIT
228 COLOR ALLOCATION TABLE STORAGE UNIT
242 THEORETICAL RECEPTION QUALITY ACQUISITION UNIT
244 COLOR ALLOCATION DETERMINATION UNIT
250 CAMERA IMAGE PROCESSING UNIT
252 CAMERA IMAGE GENERATING UNIT
254 DIRECTION DETERMINATION UNIT

The invention claimed is:

1. An image generating apparatus, comprising:
hardware, including a processor and memory;
a first image generating unit implemented at least by the hardware and configured to generate a first image showing, in a two-dimensional coordinate system having coordinate axes respectively corresponding to angles of an antenna in two axial directions, reception quality information indicating a quality of a received signal received by the antenna at each of antenna angles, the antenna angles being the angles of the antenna in the two axial directions; and
a second image generating unit implemented at least by the hardware and configured to generate a second image, the second image being a photographed image of a direction in which the antenna faces at the antenna angles, wherein
the first image is used to adjust the antenna angles,
the image generating apparatus further comprises a determination unit implemented at least by the hardware and configured to determine validity of the adjusted antenna angle by using at least the second image, and
when a highest quality indicated in the first image is equal to or larger than a first value, the determination unit determines that the adjusted antenna angles are valid, the first value being determined in advance based on a theoretical value of a quality of a received signal in the antenna.

2. The image generating apparatus according to claim 1, wherein, in the first image, the reception quality information is plotted so that the reception quality information indicating the same quality becomes visually the same image representation.

3. The image generating apparatus according to claim 1, wherein when an image showing an antenna of an opposite station facing the antenna is included in the second image, the determination unit determines that the adjusted antenna angles are valid.

4. The image generating apparatus according to claim 3, wherein the determination unit determines whether the adjusted antenna angles are valid by using an image showing the antenna of the opposite station and an image showing an object other than the antenna of the opposite station included in the second image.

5. The image generating apparatus according to claim 1, wherein when the highest quality indicated in the first image is lower than the first value, the determination unit determines a cause that affects the quality of the received signal by using an image showing the object other than the antenna of the opposite station facing the antenna, the object possibly being included in the second image.

6. The image generating apparatus according to claim 5, wherein when the highest quality indicated in the first image is lower than the first value and the image showing the object is included in the second image, the determination unit determines the cause that affects the quality of the received signal based on a difference between a position corresponding to the adjusted antenna angles in the second image and a position of the image showing the object in the second image.

7. A communication apparatus, comprising:
the image generating apparatus according to claim 1;
a transceiver configured to transmit or receive a signal through the antenna;
a sensor configured to detect the antenna angles and acquire antenna angle information indicating the detected antenna angles;
a measure configured to measure the quality of the received signal and acquire the reception quality information; and
a camera configured to photograph a direction in which the antenna faces.

8. An antenna adjustment method, comprising:
generating a first image showing, in a two-dimensional coordinate system having coordinate axes respectively corresponding to angles of an antenna in two axial directions, reception quality information indicating a quality of a received signal received by the antenna at each antenna angle being the angles of the antenna in the two axial directions;

generating a second image that is a photographed image of a direction in which the antenna faces at the antenna angles;
determining antenna angles of the antenna by using the first and second images,
adjusting the antenna angles by using the first image data;
determining validity of the adjusted antenna angles by using at east the second image; and
when a highest quality indicated in the first image is equal to or larger than a first value, the adjusted antenna angles are determined to be valid, the first value being determined in advance based on a theoretical value of a quality of a received signal in the antenna.

9. The antenna adjustment method according to claim 8, wherein when an image showing the antenna of the opposite station facing the antenna is included in the second image, the adjusted antenna angles are determined to be valid.

10. The antenna adjustment method according to claim 9, wherein the adjusted antenna angles are determined whether they are valid by using an image showing the antenna of the opposite station and an image showing an object other than the antenna of the opposite station included in the second image.

11. The antenna adjustment method according to claim 8, wherein when the highest quality indicated in the first image is lower than the first value, a cause that affects the quality of the received signal is determined by using an image showing the object other than the antenna of the opposite station facing the antenna, the object possibly being included in the second image.

12. The antenna adjustment method according to claim 11, wherein when the highest quality indicated in the first image is lower than the first value and the image showing the object is included in the second image, the cause that affects the quality of the received signal is determined based on a difference between a position corresponding to the adjusted antenna angles in the second image and a position of the image showing the object in the second image.

* * * * *

UNITED STATES PATENT AND TRADEMARK OFFICE
CERTIFICATE OF CORRECTION

PATENT NO.         : 10,693,571 B2
APPLICATION NO.    : 16/311336
DATED              : June 23, 2020
INVENTOR(S)        : Tomohiro Kikuma It is certified that error appears in the above-identified patent and that said Letters Patent is hereby corrected as shown below:

In the Claims

Column 27, Line 8; Claim 8, delete "east" and insert --least-- therefor

Signed and Sealed this
Twenty-second Day of December, 2020

Andrei Iancu
*Director of the United States Patent and Trademark Office*